US010289827B2

(12) United States Patent
Kitagawa

(10) Patent No.: US 10,289,827 B2
(45) Date of Patent: May 14, 2019

(54) INFORMATION DISPLAY DEVICE

(71) Applicant: Universal Entertainment Corporation, Koto-ku, Tokyo (JP)

(72) Inventor: Shigehiko Kitagawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 64 days.

(21) Appl. No.: 15/471,027

(22) Filed: Mar. 28, 2017

(65) Prior Publication Data
US 2017/0286662 A1 Oct. 5, 2017

(30) Foreign Application Priority Data
Mar. 30, 2016 (JP) .................................. 2016-069429

(51) Int. Cl.
| | | |
|---|---|---|
| *G06F 21/00* | (2013.01) | |
| *G06F 21/34* | (2013.01) | |
| *G07F 7/08* | (2006.01) | |
| *G07F 17/32* | (2006.01) | |
| *G06Q 20/20* | (2012.01) | |
| *G07F 9/02* | (2006.01) | |

(52) U.S. Cl.
CPC .......... *G06F 21/34* (2013.01); *G06Q 20/204* (2013.01); *G07F 7/0813* (2013.01); *G07F 7/0873* (2013.01); *G07F 9/023* (2013.01); *G07F 17/3213* (2013.01); *G07F 17/3241* (2013.01)

(58) Field of Classification Search
CPC ...... G06F 21/34; G07F 7/0813; G07F 7/0873; G07F 17/3213; G07F 17/3241; G07F 9/023; G07F 17/321; G06Q 20/204
See application file for complete search history.

(56) References Cited

U.S. PATENT DOCUMENTS

| | | | | | |
|---|---|---|---|---|---|
| 5,960,086 | A | * | 9/1999 | Atalla .................... | H04L 9/0891 380/260 |
| 6,138,239 | A | * | 10/2000 | Veil ........................ | G06F 21/572 713/156 |
| 6,738,901 | B1 | * | 5/2004 | Boyles .................... | G06F 21/34 713/159 |
| 7,463,725 | B1 | * | 12/2008 | Haefliger ............ | H04L 12/2854 379/93.13 |

(Continued)

*Primary Examiner* — Ghodrat Jamshidi
(74) *Attorney, Agent, or Firm* — Potomac Law Group, PLLC; Kenneth Fagin

(57) ABSTRACT

The present invention provides an information display device which may simply display a defined information to improve the convenience. The information display device is able to read the member card having the member identification code, and access the member management server storing the plurality of information associated with the user, and display the plurality of information associated with the user. In the member management server, the plurality of information associated with the user is distinguished to be information not requiring to be authenticated and information requiring to be authenticated respectively and then is stored. The information display device acquires the information not requiring to be authenticated from the member management server according to the member identification code under the condition of reading the member card, and directly display the acquired information not requiring to be authenticated without being authenticated by the user.

5 Claims, 24 Drawing Sheets

(56) References Cited

U.S. PATENT DOCUMENTS

| | | | | |
|---|---|---|---|---|
| 8,468,089 | B1* | 6/2013 | Abad-Peiro | G06Q 20/02 |
| | | | | 705/35 |
| 9,230,254 | B1* | 1/2016 | Sharifi Mehr | G06Q 20/3567 |
| 2003/0190076 | A1* | 10/2003 | DeLean | G06F 21/32 |
| | | | | 382/209 |
| 2004/0050931 | A1* | 3/2004 | Ono | B42D 25/00 |
| | | | | 235/380 |
| 2004/0052418 | A1* | 3/2004 | DeLean | G06F 21/32 |
| | | | | 382/209 |
| 2012/0122557 | A1* | 5/2012 | Kowolik | G07F 17/3202 |
| | | | | 463/25 |
| 2015/0134330 | A1* | 5/2015 | Baldwin | G06F 21/32 |
| | | | | 704/232 |
| 2017/0201376 | A1* | 7/2017 | Morgner | H04L 9/3234 |

* cited by examiner

FIG.21

MEMBER MANAGEMENT TABLE

| MEMBER IDENTIFICATION CODE | MEMBER NAME | MEMBER NAME AUTHENTICATING | FACIAL IMAGE | FACIAL IMAGE AUTHENTICATING | ... | CUSTOMER CLASS | CUSTOMER CLASS AUTHENTICATING |
|---|---|---|---|---|---|---|---|
| 0001 | ○○○○ | NOT REQUIRING | ...¥image0001.jpg | NOT REQUIRING | ... | VIP | REQUIRING |
| 0002 | △△△△ | NOT REQUIRING | ...¥image0002.jpg | NOT REQUIRING | ... | MEMBER | REQUIRING |
| 0003 | ▽▽▽▽ | NOT REQUIRING | ...¥image0003.jpg | NOT REQUIRING | ... | MEMBER | NOT REQUIRING |
| 0004 | □□□□ | NOT REQUIRING | ...¥image0004.jpg | REQUIRING | ... | VISITOR | REQUIRING |
| 0005 | ××××  | NOT REQUIRING | ...¥image0005.jpg | REQUIRING | ... | MEMBER | NOT REQUIRING |
| 0006 | ◎◎◎◎ | NOT REQUIRING | ...¥image0006.jpg | NOT REQUIRING | ... | MEMBER | REQUIRING |
| 0007 | ◇◇◇◇ | REQUIRING | ...¥image0007.jpg | REQUIRING | ... | MEMBER | REQUIRING |
| 0008 | ▲▲▲▲ | NOT REQUIRING | ...¥image0008.jpg | NOT REQUIRING | ... | VIP | NOT REQUIRING |
| 0009 | ☆☆☆☆ | REQUIRING | ...¥image0009.jpg | REQUIRING | ... | VISITOR | NOT REQUIRING |
| ... | ... | ... | ... | ... | ... | ... | ... |

INFORMATION DISPLAY DEVICE

CROSS-REFERENCE TO RELATED APPLICATION

The present application claims priority from Japanese Patent Application No. 2016-069429, which was filed on Mar. 30, 2016, the disclosure of which is herein incorporated by reference in its entirety.

FIELD OF THE INVENTION

The present invention relates to an information display device.

BACKGROUND OF THE INVENTION

A plurality of gaming machines are disposed in a game hall such as a casino, and if it is a large game hall, the area of such game hall will be greater than 50,000 square meter, wherein the number of the gaming machines disposed will be more than 3000.

In recent years, one proposed a game system: a player tracking device which may read in an information of an IC card is disposed in the gaming machine disposed in the game hall, and the IC card may be used to conduct a game (referring to the specification of the US Patent Application No. 2012/0135799).

According to the game system recorded in the patent document 1, for example, when a player inserts an IC card into a player tracking device, a balance information of the player managed by the IC card will be displayed in a displayer device of the player tracking device, and a credit data managed by the IC card may be used to conduct a game in the gaming machine. In order to produce the card, an identity document such as a passport may be provided so that the card is produced in a dedicated counter of the casino. The casino operators may manage the player who has the card with an identification information associated with the player card (for example, a RFID associated with a chin in the card).

The player logs in an information display device such as the player tracking device by using the player card and may manage the information thereof by referring to the player card. In addition, the staff of the game hall also owns the above IC card, and when the staff logs in the information display device, a management picture for the staff is displayed.

BRIEF SUMMARY OF THE INVENTION

Technical Problem

However, in general, when referring to the information thereof, the information display device is required to read the IC card, and logging in after performing an authentication such as inputting a PIN code. Therefore, even if the player wants to simply refer to the defined information thereof such as the current credit amount, however since it takes time to log in the information display device to performing the authentication, the player may consider it to be a game hall lacking convenience, resulting to the player keeping respectfully aloof from the game hall.

For this regard, a goal of the present invention is to provide an information display device which may simply display a defined information to provide a convenience.

Technical Solution

The information display device of the present invention comprises:
a reading card device, which is able to read the card owned by the user, and the card contains a user identification information used to identify the user;
an accessing device, which is able to access an upper level device, and a plurality of information associated with the user is stored in the upper level device;
a display, which is able to display the plurality of information associated with the user; and
a controller,
in the upper level device, the plurality of information associated with the user is distinguished to be information not requiring to be authenticated and information requiring to be authenticated respectively and then stored,
the controller
in the condition that the reading card device reads the card, acquiring the information not requiring to be authenticated from the upper level device according to the user identification information, directly displaying the acquired information not requiring to be authenticated in the display without being authenticated by the user.

According to the above structure, in the upper level device storing the plurality of information associated with the user, the plurality of information associated with the user is respectively distinguished to be information not requiring to be authenticated and information requiring to be authenticated and then is stored. After the user uses the information display device to read the card, for the information not requiring to be authenticated acquired from the upper level device, it is directly displayed without being authenticated such as login by the user. Thereby, the user only uses the information display device to read the card, and regarding the information which is set to be information not requiring to be authenticated, it is automatically displayed by the information display device without being authenticated such as login, and thus it may increase the convenience for the user who wants to confirm the information not requiring to be authenticated.

In addition, the information display device of the present invention may be configured to, further comprise an input device for receiving an input of the user, the controller dependently switch the plurality of information associated with the user stored in the upper level device to be the information not requiring to be authenticated or the information requiring to be authenticated according to the input of the user.

According to the above structure, the user may select which information is taken as the information displayed in the information display device without being authenticated from the plurality of information associated with the user stored in the upper level device such that the information which is automatically displayed in the information display device without being authenticated is defined to be the information desired by the user.

According to the present invention, a defined information may be simply displayed such that it is able to provide a convenience.

BRIEF DESCRIPTION OF THE DRAWINGS

FIG. 21 is a diagram representing a member management table of an embodiment of the present invention.

DETAILED DESCRIPTION OF THE PREFERRED EMBODIMENT

The present invention is illustrated according to the drawings.

[Summary of the Card (Member Card)]

The card of the present invention is a card in which an information of an owner of the card is printed. In the present embodiment, the card is a member card which is printed with a player information of a casino in a dedicated counter which is used to perform an admission procedure (hereinafter, referred as an admission counter) and is issued on the spot, and wherein the admission procedure is disposed in the casino. However, the present invention is not limited to such card. A card which is printed with an owner information and for recognizing the owner is feasible. In addition, the card is not limited to a card which is issued to the owner on the spot, and may be delivered in the future. In the following illustration, a player owning the member card 2 is referred as a member.

Figure 1:
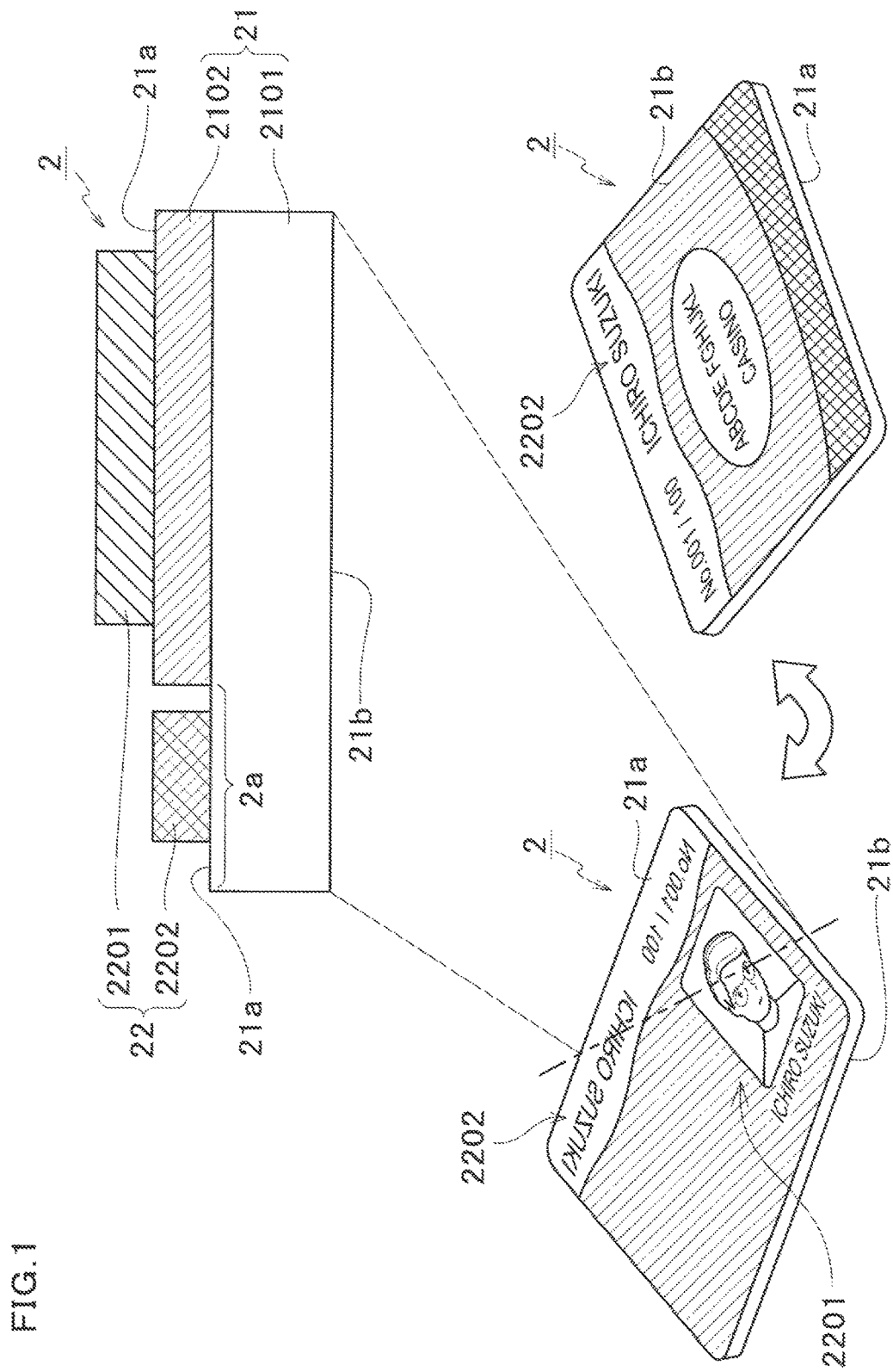
FIG. 1 is a schematic diagram representing a member card of an embodiment of the present invention.

To be more specific, as shown in FIG. 1, the member card 2 of the present embodiment comprises: a base material layer 21 having a light transmittable base material 2101; and a printing layer 22. The printing layer 22 is configured to only print a first information 2201 to be confirmed from one surface of the base material 21 (hereinafter, referred as a first surface 21a) and a second information 2202 to be confirmed from the other surface of the base material (hereinafter, referred as a second surface 21b) on a first surface 21a of the base material layer, The base material layer 21 is configured to be that a region which is printed with the second information 2202 is light transmittable (a light transmittable region 2a), and furthermore, the second information 2202 may be visually recognized from the second surface of the base material layer 21. In addition, the first information 2201 and the second information 2202 represent a text information contained respectively or a display state under a printed state.

Thereby, when the member card 2 is issued on the spot, only the first surface 21a of the base material layer 21 is required to be printed, and thus the member card 2 is not required to turn over to be printed again such that the card is issued smoothly.

"The first information 2201 to be confirmed from the first surface 21a" means that the first information 2201 is not a horizontal flipping mirror image when the first information 2201 is visually recognized from the first surface 21a, and it is visually recognized as a normal image. That is to say, "the first information 2201 to be confirmed from the first surface 21a" means that if the first information 2201 is capable of being visually recognized from the second surface 21b, the first information 2201 is visually recognized to be a horizontal flipping mirror image. In addition, in the present embodiment, the first information 2201 is only visually recognized from the first surface 21a of the member card 2.

Likewise, "the second information 2202 to be confirmed from the second surface 21b" means that the second information 2202 is not a horizontal flipping mirror image when the second information 2202 is visually recognized from the second surface 21b, and it is visually recognized as a normal image. That is to say, "the second information 2202 to be confirmed from the second surface 21b" means that if the second information 2202 is visually recognized from the first surface 21a, the second information 2202 is visually recognized to be a horizontal flipping mirror image. In the present embodiment, the second information 2202 is able to be visually recognized from both surfaces of the member card 2.

In the present embodiment, the first information 2201 is a facial image of a player and a name image of a player. On the first surface 21a, the first information 2201 is printed to be a normal image but not a horizontal flipping mirror image. In addition, the second information 2202 is a name image of a player. On the first surface 21a, the second information 2202 is printed to be a horizontal flipping mirror image. In addition, a player information contained in the first information 2201 and the second information 2202 is not limited thereto. For example, under the condition that the second information 2202 contains a facial image of a player, the second information 2202 is printed to be a mirror image of a facial image of a player horizontal flipping.

In addition, the light transmittable region 2a does not include all regions in which the second information 2202 is printed. For example, the light transmittable region 2a may also include a portion of a region in which the second information 2202 is printed. That is, it may be configured to be that only a portion of the second information 2202 is visually recognized from the second surface 21b. In addition, the light transmittable region 2a may also be arranged onto the whole surface of the member card 2.

In the present embodiment, the base material layer 21 has an opaque layer 2102, and the opaque layer 2102 stacks up to cover the first information 2201. Thereby, the first information 2201 may be only visually recognized from the first surface 21a of the base material layer 21. That is, the first information 2201 is prevent being visually recognized to be a mirror image from the second surface 21b. In addition, in the present embodiment, the light transmittable region 2a is consistent with a region which is not stacked with the opaque layer 2102 in the member card 2.

[The Summary of the Card Printing Control Device]

The card printing control device of the present invention is a device which is used to print the above owner information onto a base card to produce the member card 2. In the present embodiment, the card printing control device is disposed in an admission counter. A professional clerk of a casino operation resides permanently in the admission counter. The above clerk issues the member card according to the requirements of a player who wants to play a game in the casino. When the above clerk deals with the issuing of the card, accepting a personal information of a user and inputting the personal information into the card printing control device. The card printing control device prints the personal information onto a pre-produced base card by controlling a card printed disposed such that a member card of the user is produced. In addition, the card printing control device is not limited to the above. For example, it may also be configured to automatically produce the member card according to the personal information input by the user who wants to produce a card without the help of the clerk. In addition, the card printing control device may also comprise a card printer. In addition, in the present embodiment, the user is a player who is playing a game in the casino, but it is not limited thereto. For example, the user may also be a clerk who works in the casino.

The card printing control device 3 accepts an information about a player input by the clerk and prints the information about the player onto the base card (base material layer 21) by controlling the printer such that the above member card 2 is produced. That is, the card printing control device 3 stacks the printing layer 22 onto the base material layer 21 such that is member card 2 is produced.

Figure 2:
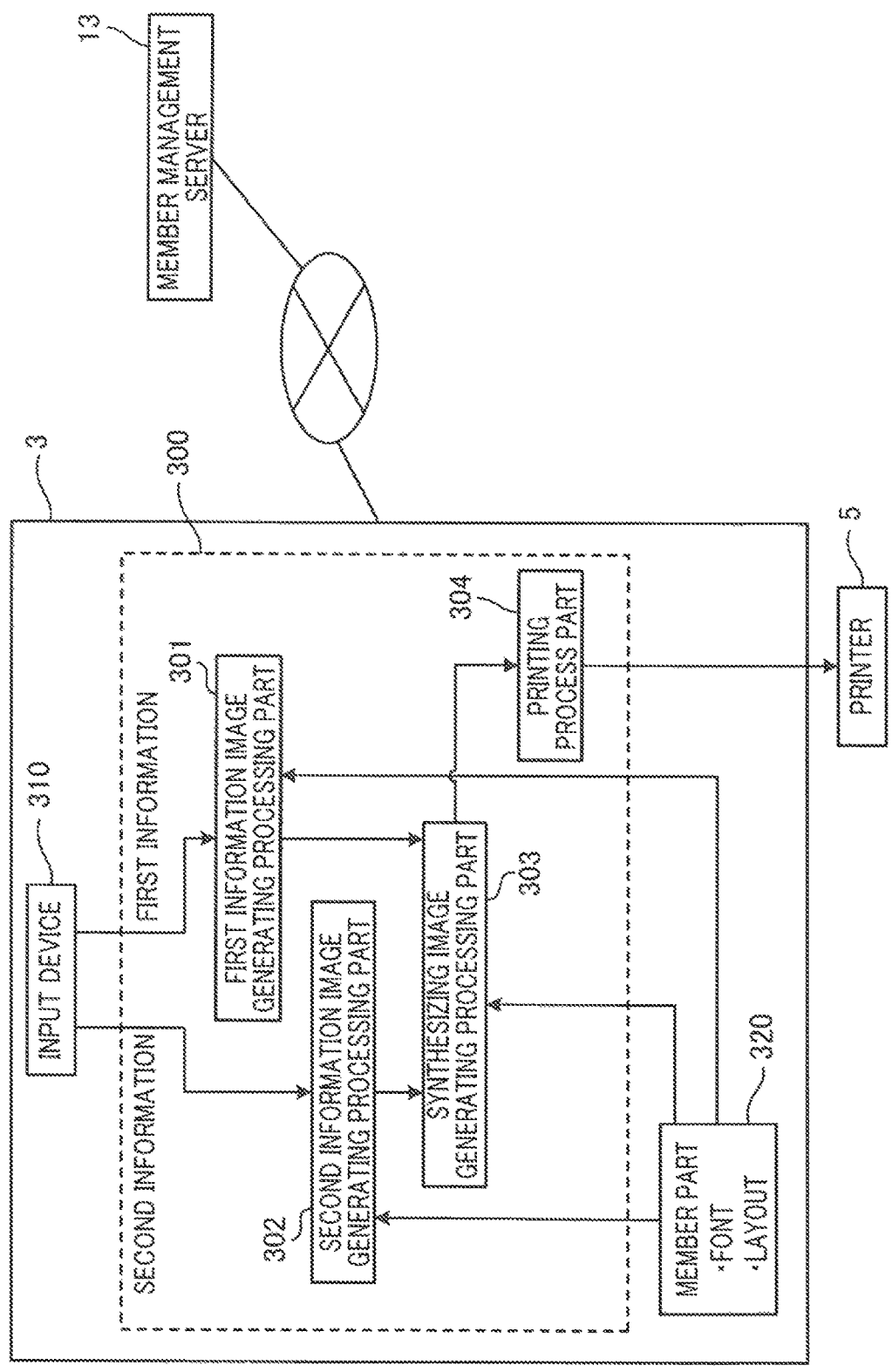
FIG. 2 is a schematic diagram representing a card printing control device of an embodiment of the present invention.

To be more specific, as shown in FIG. 2, the card printing control device 3 is connected to a printer 5 which may print the base card. In other word, a card printing system comprising the card printing control device 3 and the printer 5 therein is formed.

The card printing control device 3 comprises a controller 300, an input device 310 and a memory part 320. The input device 310 is capable of inputting the first information 2201 to be confirmed from the first surface 21a of the member card 2 and the second information 2202 to be confirmed from the second surface 21b of the member card 2.

The controller 300 comprises a first information image generation processing part 301, a second information image generation processing part 302, a synthetic image generation processing part 303 and a printing processing part 304. The first information image generation processing part 301 generates the first information image which contains the first information 2201 from the input device 310. The second information image contains the second information 2202 from the input device 310, and in the second information image, the second information 2202 is formed to be a horizontal flipping mirror image. The synthetic image generation processing part 303 performs a synthetic processing such that the first information image and the second information image are configured into different regions of the member card. The printing processing part 304 only prints the synthetic image synthesized by the synthetic image generation processing part 303 onto the first surface 21a of the base card (base material layer 21). In addition, the synthetic image generation processing part 303 generates a synthetic image such that the second information image is configured into the light transmittable region 2a of the base card. Thereby, the second information image which is printed to be a horizontal flipping mirror image on the first surface 21a may be visually recognized as a normal image when observed from the second surface 21b.

The memory part 320 stores an information input, a font data which is used to form the information input to be an image, and a layout data which is used to synthesize an image. For example, the first information image generation processing part 301 and the second information image generation processing part 302 changes the information input to be a character width which may be contained in a predetermined region with a predetermined font referring to the memory part 320, and forms it to be an image. In addition, the synthetic image generation processing part 303 synthesizes the first information image and the second information image referring to the memory part 320 to make it to be a predetermined layout.

As mentioned above, the first information image to be confirmed from the first surface 21a of the member card 2 and the second information image to be confirmed from the second surface 21b of the member card 2 are generated only through inputting the first information and the second information and they are printed onto the card after being synthesized. The second information image is printed after being formed to be a horizontal flipping mirror image, and thus the second image may be visually recognized normally when the layer printed is visually recognized from the second surface 21b through the light transmittable region 2a of the light transmittable base material layer 21. Thereby, the printing layer 22 is only printed on the first surface 21a of the base card when the member card 2 is issued on the spot, and the information to be confirmed from the front surface and the information to be confirmed from the back surface are printed just one time without turning over the base card such that the member card 2 is able to be issued smoothly.

In addition, in the present embodiment, the card printing control device 3 comprises a CPU (Central Processing Unit), an EEPROM (Electrically Erasable and Programmable Read Only Memory) alterably storing a program executed by the CPU and a data for the program, and a RAM (Random Access Memory) temporarily storing the data when executing the program. The above controller 300 (respective processing parts 301-304) and the memory part 320 comprised in the card printing control device 3 are configured to cooperate with the hardware and the software in the EEPROM. In addition, the card printing control device 3 is not limited to one computer and may be set to disperse the functions into a plurality of processing devices. The input device 310 is a photographic device such as a camera, a keyboard, a mouse, and a touch panel disposed in the display, etc.

In addition, as shown in FIG. 2, the card printing control device 3 may also be data communicatively connected with a member management server 13 through a network. The member management server 13 is a server which is used to store and manage the personal information of the member, the information of the member card (IC card), and a game result of the member in the past. The personal information of the member input and the identification code of the member card are stored into the member management server 13 together when performing a login with members. In addition, a member card issuance terminal comprises a camera, and may also take pictures of a surface of the player receiving the IC card issued when issuing the member card. The image which is taken and the identification code are correspondingly stored into the member management server 13. As mentioned above, the member management server 13 is a server which is used to store and manage the personal information of the member and the information of the member card 2. In the present embodiment, in the card printing control device 3, the above login processing of the information is performed for the member management server 13 when the member card 2 is issued by the card printing control device 3.

[The Summary of the Information Display Device]

The information display device of the present invention displays the information of the owner (user) owning the card by reading the above card. In the present embodiment, the information display device is a PTS terminal disposed within the gaming machine arranged in the casino, a signage and a kiosk terminal disposed in the casino, and it is not limited thereto. For example, it may also be an information display device which is disposed at a security gate between an entrance of the casino and the floor.

Figure 3:
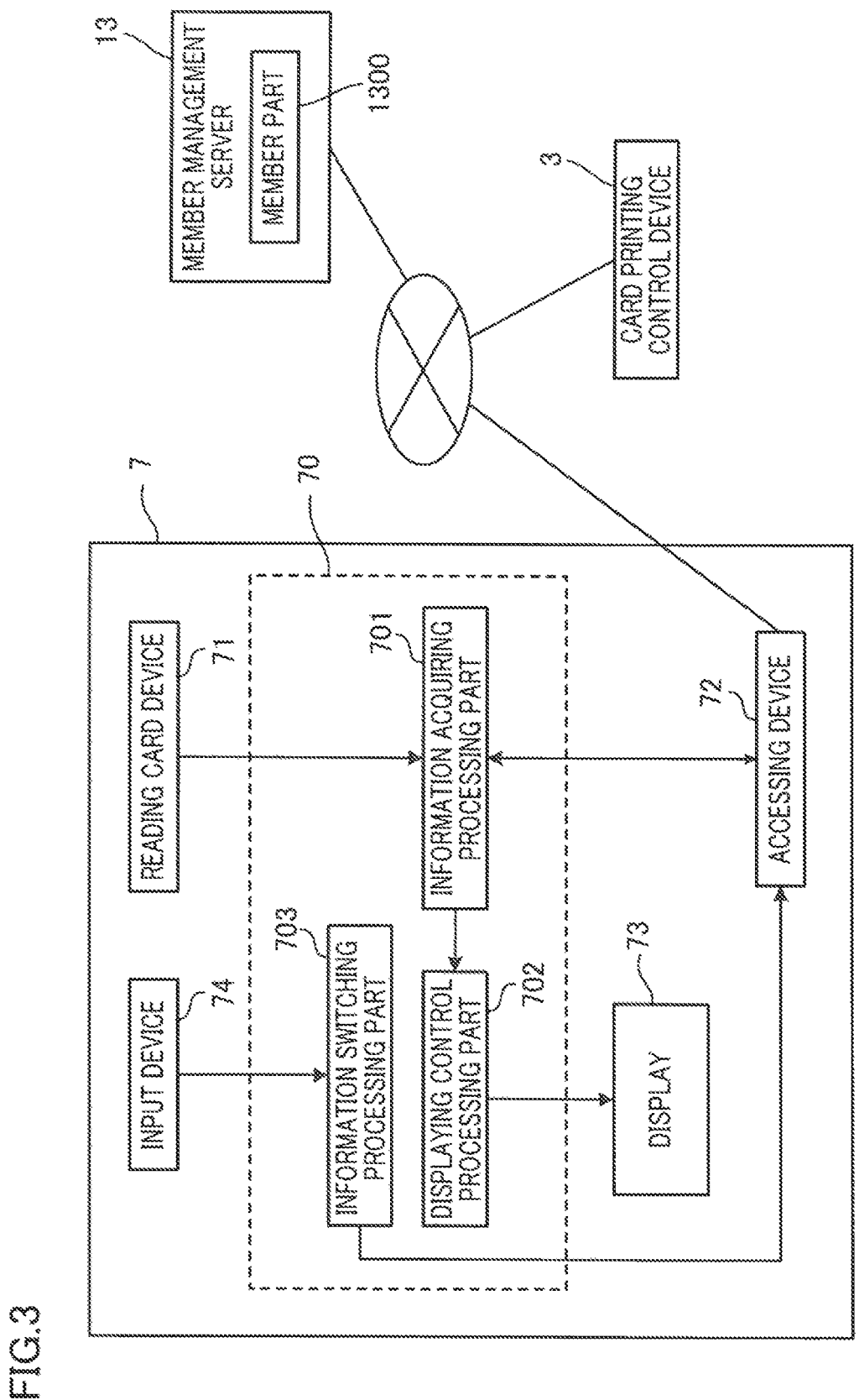
FIG. 3 is a schematic diagram representing an information display device of an embodiment of the present invention.

To be more specific, as shown in FIG. 3, the information display device 7 comprises a reading card device 71, an accessing device 72, a display 73, an input device 74, and a controller 72. The reading card device 71 is a device which is able to read the member card 2 owned by the user, and the member card 2 contains a user identification information which is used to identify the user. The accessing device 72 is a device which may perform an access on the upper level device (the member management server 13), and a plurality of information associated with the user is stored in the upper level device (the member management server 13). The display 73 is a device which is able to display the plurality of information associated with the user. The input device 74 is a device which receives the input from the user.

The member management server 13 of the upper level device on which the information display device 7 performs the access comprises a memory part 1300 storing a plurality of information associated with the user. The memory part 1300 stores the plurality of information associated with the user respectively for each user. Besides, in the memory part 1300, the plurality of information associated with the user is distinguished to be information not requiring to be authenticated and information requiring to be authenticated respectively and then stored.

In addition, in the present embodiment, the upper level device is set in the member management server 13. That is, a member information display system is configured to comprise the member management server 13 and the information display device 7. In addition, it is not limited thereto, for example, the upper level device may also be the member card 2 which is read in by the information display device 7.

In this case, the member card 2 stores the user identification information and the plurality of information associated with the user represented by the user identification information. That is, the reading card device 71 has the function of the accessing device 72 at the same time.

The controller 70 comprises an information acquiring processing part 701, a displaying control processing part 702, and an information switching processing part 703. The information acquiring processing part 701 acquires the information not requiring to be authenticated from the upper level device (the member management server 13) according to the user identification information stored by the member card 2 after the reading card device 71 reads the member card 2. The displaying control processing part 702 displays the acquired information not requiring to be authenticated in the display 73 without being authenticated by the user.

In addition, "displaying in the display 73 without being authenticated by the user" means to display automatically. That is, "information not requiring to be authenticated" is information which is automatically displayed in the information display device 7 after the user uses the information display device 7 to read in the member card 2.

As mentioned above, in the upper level device storing the plurality of information associated with the user, the plurality of information associated with the user is respectively distinguished to be information not requiring to be authenticated and information requiring to be authenticated and then is stored. After the user uses the information display device 7 to read the member card 2, for the information acquired from the upper level device, it is displayed without being authenticated such as login by the user. Thereby, the user only uses the information display device 7 to read the card, and regarding the information which is set to be information not requiring to be authenticated, it is automatically displayed by the information display device without being authenticated such as login, and thus it may increase the convenience for the user who wants to confirm the information not requiring to be authenticated.

In addition, the information switching processing part 703 dependently switches the plurality of information associated with the user stored in the upper level device (the member management server 13) to be information not requiring to be authenticated or information requiring to be authenticated according to the input to the input device by the user.

As mentioned above, the user may select which information is taken as the information displayed in the information display device without being authenticated from the plurality of information associated with the user stored in the upper level device such that the information which is automatically displayed in the information display device without being authenticated is defined to be the information desired by the user.

In addition, in the present embodiment, as shown in FIG. 2 and FIG. 3, the card printing control device 3 data communicatively connected with the member management server 13 through the network. Besides, the member information is logged into the member management server 13 by the card printing control device 3. In addition, the member information logged into the member management server 13 is displayed by the information display device 7. That is, a member management system is configured to comprise the member management server 13, the card printing control device 3 and the information display device 7.

[The Game Hall System]

In addition, although not shown, a plurality of gaming machines, the above card printing control device 3, information display device 7 disposed in the game hall may also be data communicatively connected with a hall management server, a bonus server, a setting management server, a monitor ring server, etc., in addition to being data communicatively connected with the member management server 13. That is, the game hall system is constituted of the gaming machines, the card printing control device 3, the information display device 7, the member management server 13, the hall management server, the bonus server, the setting management server, the monitor ring server and so on.

The hall management server gathers all of the flow of money in the hall (the game hall), generates a balance sheet, etc., and manages other servers. In addition, an accounting information is acquired from various gaming machines and is accumulated, and the accounting information contains a timing when the gaming machine starts a unit game, a timing when the gaming machine terminates the unit game, a random determination result in the unit game and so on.

The bonus server controls the bonus random determination in the bonus game and an association effect performed in association with the bonus random determination. In addition, it is used to manage the accumulated value performing a bonus awarding (for example, an accumulated credit for a progressive bonus), etc.

The setting management server stores and manages the setting regarding the gaming machine as an object of the bonus random determination and the setting regarding the association effect. In addition, in the present embodiment, the bonus game is illustrated as an example, however, it may be other type of game, such as a slot tournament and so on.

The monitor ring server is a server which is used to monitor and store the state of the hall. To be more specific, the monitor ring server acquires an environment information such as a temperature, a humidity, surrounding image and so on by the gaming machine disposed in the hall in time and displays the environment information acquired in the display matching the floor map. In addition, the monitor ring server acquires a camera information by a monitor camera disposed in the hall in time (for example, in real time, at fixed periods, response to the operation of the user) and displays the camera information acquired into the display.

[The Structure of the Member Card 2]

The member card 2 is formed by printing the information of the user onto the base card (base material layer 21) produced in advance. That is, the member card 2 is formed by stacking the printing layer 22 onto the base material layer 21.

[The Structure of the Member Card 2: The Base Material Layer 21]

Figure 4:
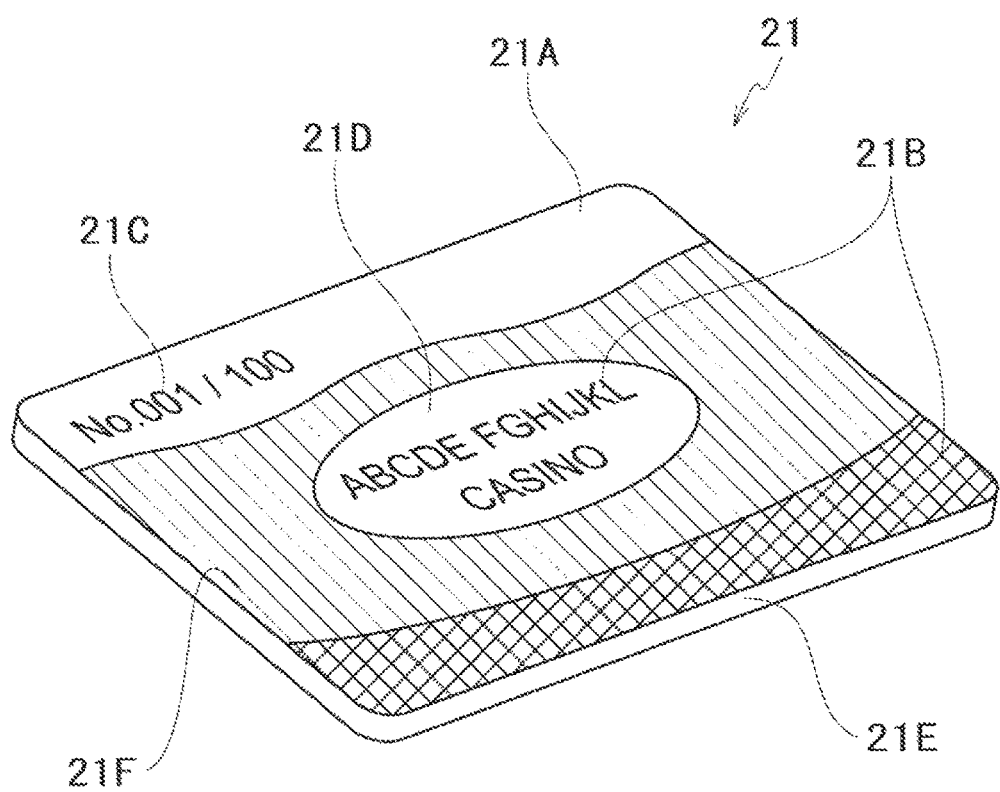
FIG. 4 is a diagram representing a base card of an embodiment of the present invention.
Figure 5:
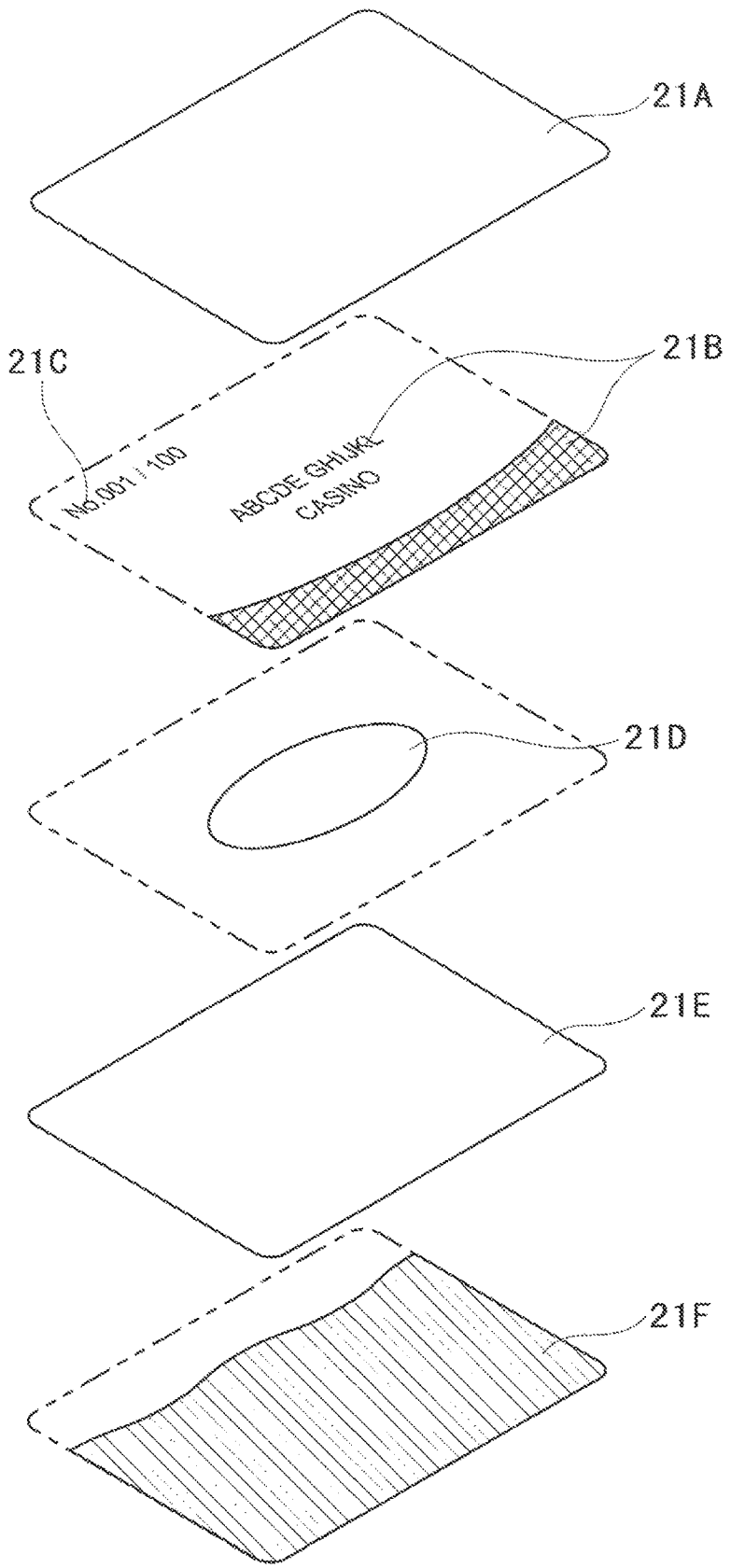
FIG. 5 is a diagram representing a laminate structure of a base material layer of an embodiment of the present invention.

As shown in FIG. 4 and FIG. 5, the base material layer 21 produced in advance comprises: a first front surface protecting stack layer 21A, a first design printing layer 21B, a numbering printing layer 21C, a hologram printing layer 21D, a transparent IC card 21E, and a second design printing layer 21F.

The transparent IC card 21E is formed by disposing an antenna, an IC chip, and a memory, etc., into a transparent resin of a card size. The hologram printing layer 21D is formed by performing a hologram printing onto a central portion of one surface of the transparent IC card 21E. The hologram printing may be directly performed to the transparent IC card 21E, and a sheet to which the hologram printing has been performed may also be stacked onto the transparent IC card 21E. As a type of the hologram, a planar stack layer hologram, a stereomodel hologram, a color and gradation hologram, and a security hologram, etc., may be listed.

The member printing layer 21C is printed and stacked onto a region of the upper left of the transparent IC card 21E different from a region stacked with the hologram printing layer 21D. The numbering printing layer 21C displays definition copies and a definition serial number. For example, the base card is produced as the number provided for each design (definition copies). Besides, different serial numbers are allocated for various base cards respectively.

The first design printing layer 21B is printed and formed on the transparent IC card 21E. In addition, a portion of the first design printing layer 21B is stacked on the hologram printing layer 21D. The first design printing layer 21B is formed by a hot stamp printing, a mirror printing and so on.

The transparent sheet made of the resin is stacked on one surface of the transparent IC card 21E to cover the whole transparent IC card 21E such that the first front surface protecting stack layer 21A is formed. Thereby, a protection is provided to one surface of the transparent IC card 21E and the first design printing layer 21B, the numbering printing layer 21C, the hologram printing layer 21D stacked on the transparent IC card 21E. In addition, one surface of the transparent IC card 21E on which the first front surface protecting stack layer 21A is stacked corresponds to the second surface 21b of the member card 2.

The second design printing layer 21F is printed and formed on a region of the other surface of the transparent IC card 21E in addition to an upper region. In the present embodiment, the second design printing layer 21F is the opaque layer 2102, and a region beyond that is the light transmittable region 2a. The second design printing layer 21F is formed by a hot stamp printing, a mirror printing, a wrinkle printing (a decoration printing: an irregular ripple shape occurs when ultraviolet rays of different wave lengths are irradiated on a dedicated UV ink) and so on.

[The Structure of the Member Card 2: The Printing Layer 22]

Figure 6:
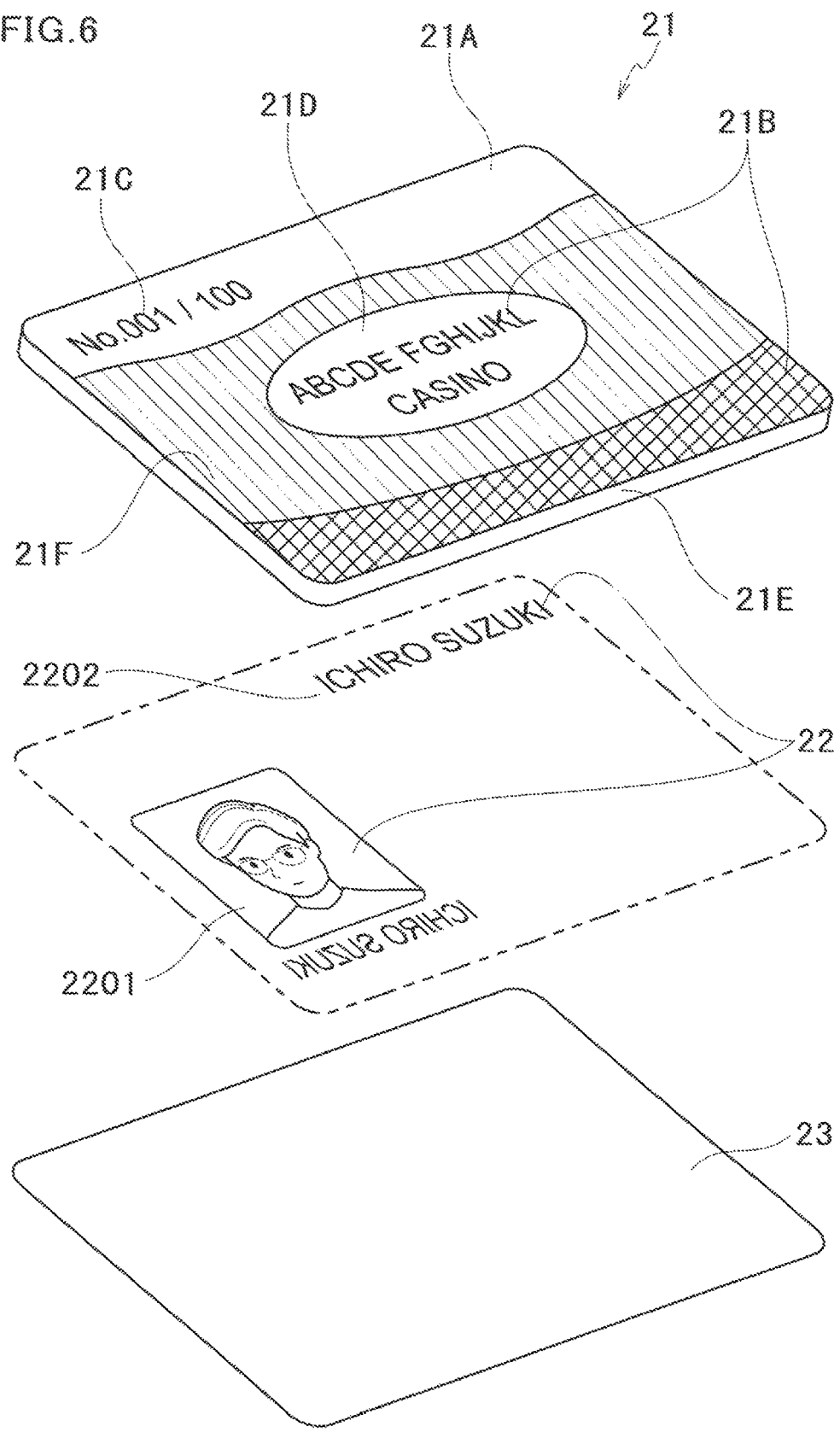
FIG. 6 is a diagram representing a laminate structure of a printing layer in a member card of an embodiment of the present invention.

As shown in FIG. 6, the above base material layer 21 is printed with the printer 5 such that the printing layer 22 is formed. In the present embodiment, the printer 5 stacks the printing layer 22 and the second front surface protecting layer 23 onto the base material layer 21. To be more specific, the printer 5 firstly transfers a print image as a reverse image onto a base film which is not shown. That is, the print image is displayed to be the following state that the first information 2201 is transferred to be a mirror image and the second information 2202 is transferred to be a normal image, when observed from one side of the base film on which the transfer is performed.

Then, the printer 5 transfers the print image of the reverse image retransferred onto the base material layer 21 such that the printing layer 22 is stacked. That is, the printing layer 22 is displayed to be the following state that the first information 2201 is transferred to be a normal image and the second information 2202 is transferred to be a mirror image, when observed from one side of the base material layer on which the retransfer is performed. Then, the printer 5 stacks the transparent sheet made of the resin onto the other surface of the transparent IC card 21E to cover the whole transparent IC card 21E such that the second front surface protecting layer 23 is formed. Thereby, a protection is provided to the other surface of the transparent IC card 21E and the second design printing layer 21F, the printing layer 22 stacked on the transparent IC card 21E. In addition, the other surface of the transparent IC card 21E on which the second front surface protecting stack layer 23 is stacked corresponds to the first surface 21a of the member card 2.

[The Member Card 2: The Display States of the First Surface and the Second Surface]

Figure 7:
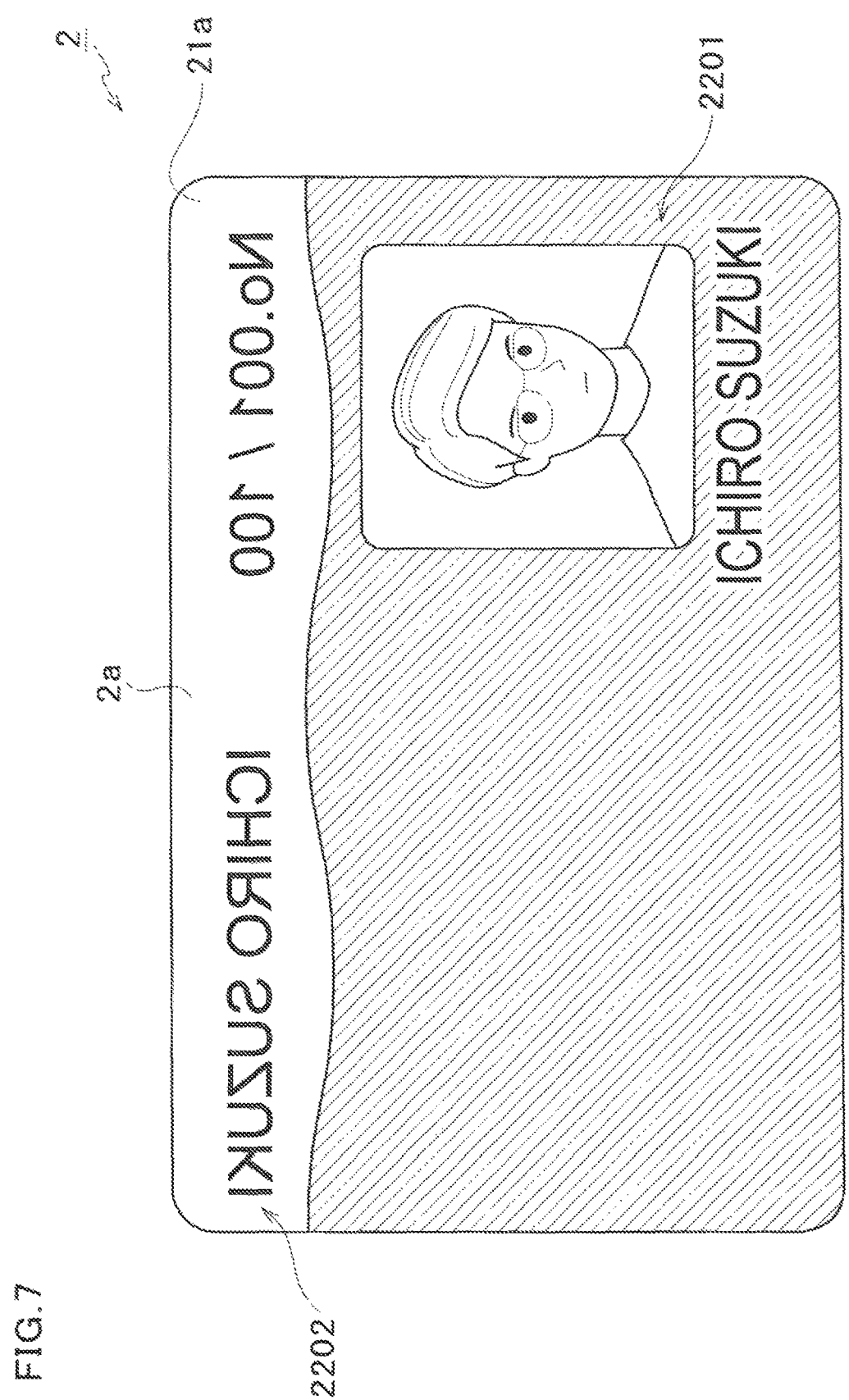
FIG. 7 is a diagram representing a member card of an embodiment of the present invention which is observed from a first surface.

As shown in FIG. 7, the first information 2201 and the second information 2202 of the printing layer 22 are both visually recognized when the member card 2 is observed from the first surface 21a of one side on which the printing layer 22 is stacked. In addition, the first information 2201 to be confirmed from the first surface 21a is printed to be visually recognized as a normal image.

Figure 8:
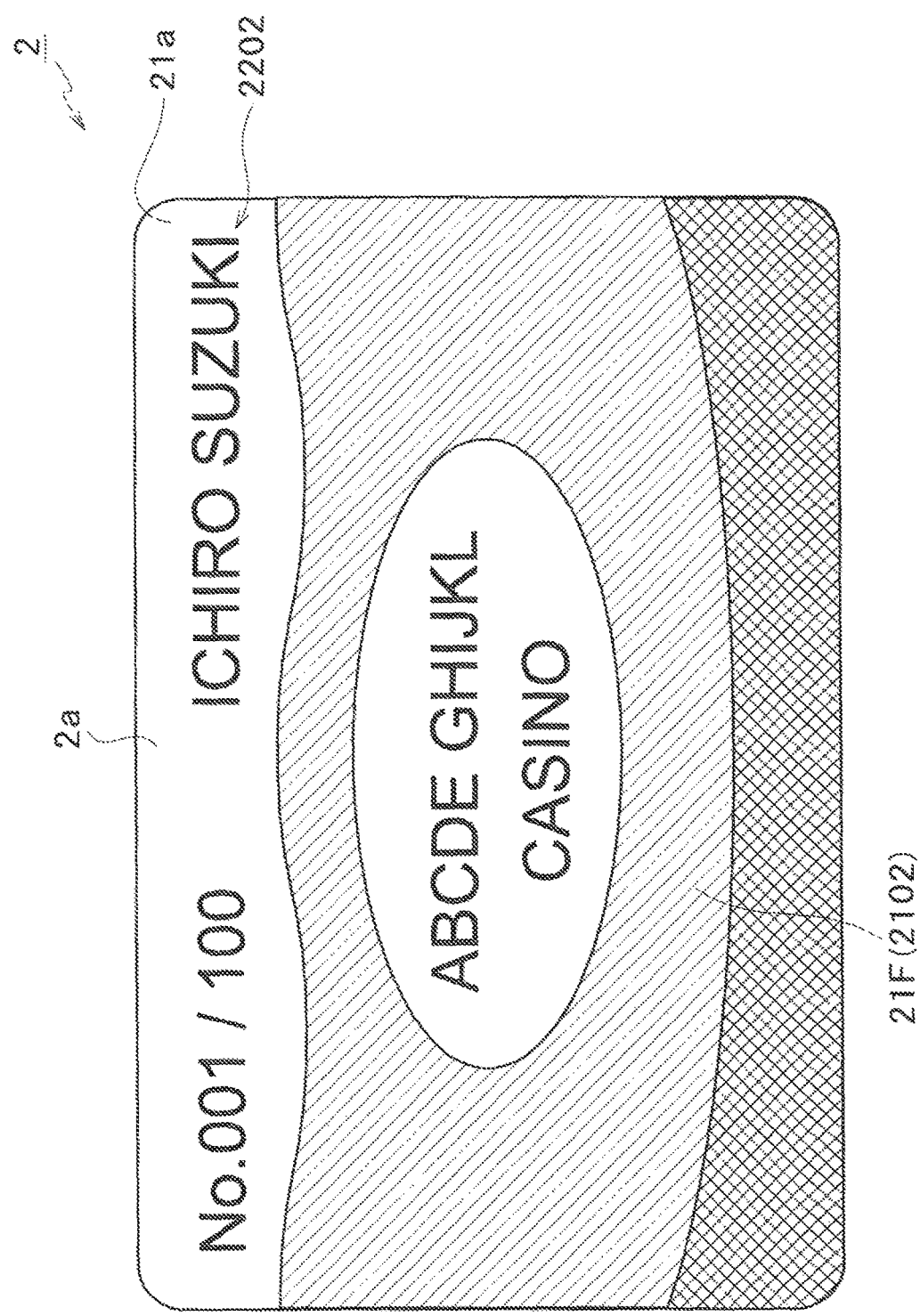
FIG. 8 is a diagram representing a member card of an embodiment of the present invention which is observed from a second surface.

In addition, as shown in FIG. 8, in the printing layer 22, only the second information 2202 is visually recognized as a normal image when the member card 2 is observed from the first surface 21a of one side opposite from the side on which the printing layer 22 is stacked. That is, the first information 2201 is shadowed by the second design printing layer 21F (the opaque layer 2102), and the first information is not able to be visually recognized from the second surface 21b.

As mentioned above, in the present embodiment, the first information 2201 is a facial image of an owner and a name of the owner, and the second information 2202 is a name of an owner. The facial image as the first information 2201 is only visually recognized from the first surface 21a. In addition, it is not limited thereto, and a region which is printed with a facial image may be set to be the light transmittable region 2a such that the facial image may be visually recognized from the both surfaces. That is, since it may not be judged whether the facial image is horizontal flipped, it may be configured to be that the normal image and the mirror image thereof are visually recognized.

[The Structure of the Information Display Device 7]

To be more specific, the information display device 7 is illustrated by taking the PTS (Player Tracking System) terminal, the signage, the kiosk terminal as examples. The PTS terminal is carried onto the various gaming machines disposed in the casino hall. First of all, as an example of the gaming machine, a slot machine carrying the PTS as the information display device 7 therein is illustrated.

[The Structure of the Information Display Device 7: Illustration of the Function Flow Chart of the Slot Machine]

Figure 9:
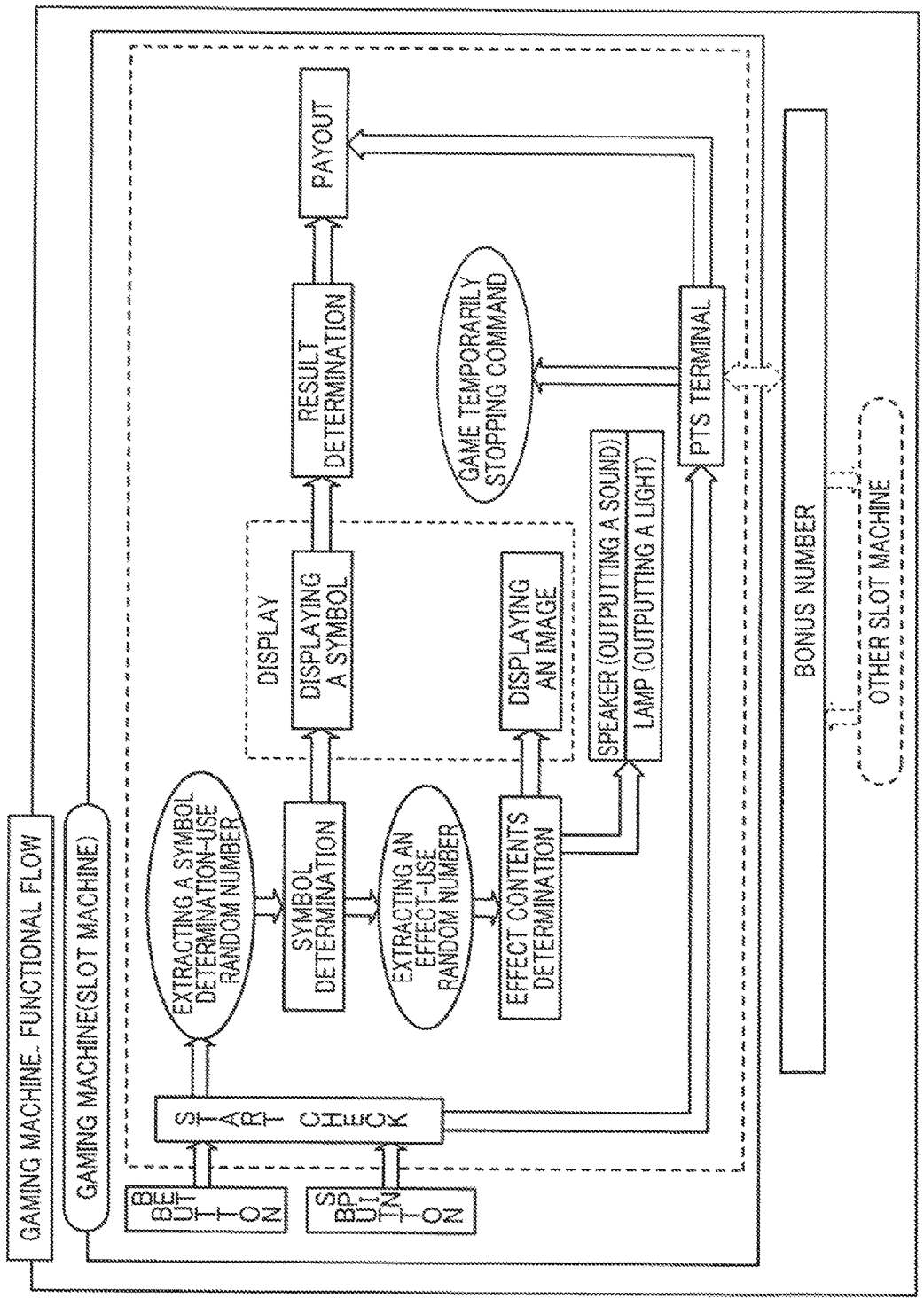
FIG. 9 is a diagram representing the fundamental function of a slot machine of an embodiment of the present invention.

Refer to FIG. 9, fundamental function of the slot machine is illustrated. As shown in FIG. 9, the slot machine 1010 may be data communicatively connected with an external controller, and the external controller may be data communicatively connected with other various slot machines 1010 disposed in the hall.

[Start Check]

First, the slot machine 1010 checks whether a BET button is pressed by a player, and then checks whether a spin button is pressed by a player.

[Symbol Determination]

Next, when the spin button is pressed, the slot machine 1010 extracts a symbol determination random number, and the symbol to be displayed to the player when a symbol array stops scrolling is determined according to each video reels of a plurality of video reels displayed on the display.

[Symbol Display]

Next, the slot machine 1010 causes the symbol array of various video reels to start to scroll, and stop scrolling when the symbol determined is displayed to the player.

[Result Determination]

Next, when the symbol array of various video reels stops scrolling, the slot machine 1010 judges whether a combination of the symbols displayed to the player is winning.

[Payout]

Next, when the combination of the symbols which are displayed to the player is winning, the slot machine 1010 gives a benefit corresponding to the kind of the above combination of symbols to the player. For example, when a combination of symbols related to a payout is displayed, the slot machine 1010 gives a payout corresponding to the above combination of symbols to the player.

[Effect Determination]

The slot machine 1010 performs an effect by an image display based on the display, a light output based on a lamp and a sound output based on a speaker. The slot machine 1010 extracts an effect-use random number and determines contents of the effect according to symbols determined by drawing lots.

In addition, when the drawing lots for the bonus game is performed, an association effect among a plurality of gaming machines is carried out by a display device, a light emitting portion and a speaker of the PTS terminal 1700.

[The Structure of the Information Display Device 7: The Overall Structure of the Slot Machine]

Figure 10:
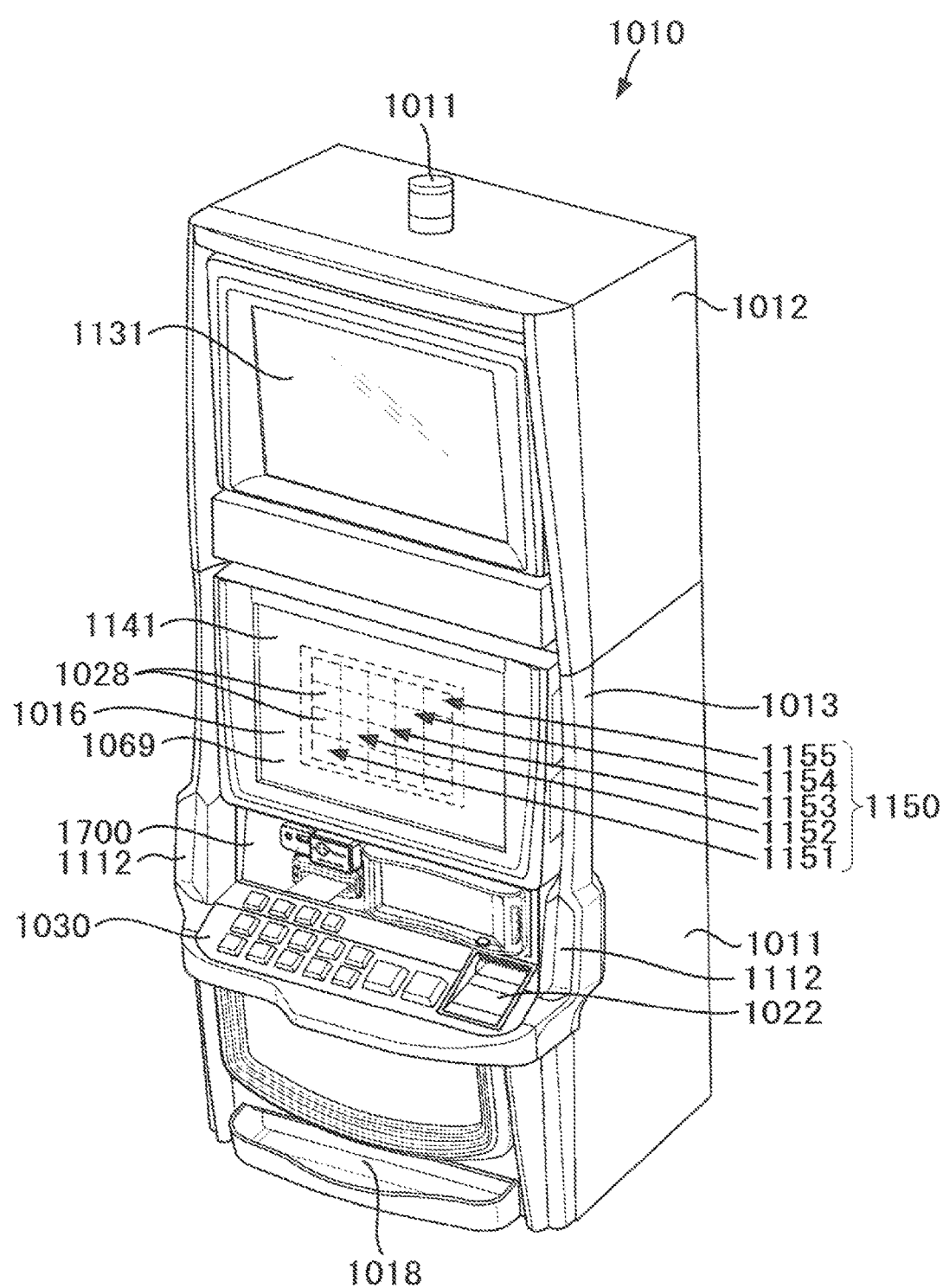
FIG. 10 is a diagram representing an overall structure of a slot machine of an embodiment of the present invention.

Next, refer to the FIG. 10, the overall structure of the slot machine 1010 is illustrated.

In the slot machine 1010, as a gaming medium, an IC card, a bill, or an electronic information having a price corresponding to it may be adopted. In particular, in the present embodiment, a data associated with the credit such as a cash data which is stored in an IC card 1500 is adopted. In addition, the above member card 2 may also has the function of the IC card 1500.

The slot machine 1010 comprises a cabinet 1011, a top box 1012 disposed at an upper side of the cabinet 1011, and a main door 1013 disposed at a front surface of the cabinet 1011.

A symbol display device 1016 is disposed in the main door 1013, which is termed as a lower image display panel 1141. The symbol display device 1016 is formed of a transparent liquid crystal panel. In the picture displayed in the symbol display device 1016, a display window 1150 is comprised in the center thereof. The display window 1150 is constituted of 20 display blocks 1028 of 5 columns and 4 rows. Each column of 4 display blocks 1028 forms simulated reels 1151-1155, which rotate according to the operation of the player. Various simulated reels 1151-1155 are able to perform a rearrangement that 4 display blocks 1028 change a speed while move downward and display as a whole, and thereby symbols 1501 displayed in various display blocks 1028 rotate along a length wise direction and then stop.

Wherein, the "rearrangement" means a state that the symbols 1501 is rearranged after the arrangement of the symbols 1501 is dismissed. The "arrangement" means a state the symbols 1501 may be confirmed by a visual contact with respect to the player outside. A so-called slot game is conducted by the slot machine 1010 according to the state of the arrangement of the symbols 1501 when the simulated reels 1151-1155 rotated stop, and a payout corresponding to a predetermined combination is paid to the player in the slot game.

In addition, in the present embodiment, a so-called video slot machine for the slot machine 1010 is illustrated, and however in the slot machine 1010 of the present invention, a portion of the simulated reels 1151-1155 may be replaced with a so-called mechanical driven type reel.

Besides, a touch panel 1069 is disposed on the front surface of the symbol display device 1016, and the player may input various instructions by operating the touch panel 1069. An input signal is sent from the touch panel 1069 to a main CPU 1071.

An upper image display panel 1131 is disposed on the front surface of the top box 1012. The upper image display panel 1131 is constituted of a liquid crystal panel, which forms a display. The upper image display panel 1131 displays an image related to the effect, an image used to represent the introduction of game contents, and an image used to represent the illustration of a rule. In addition, a speaker 1112 and a lamp 1111 are disposed in the top box 1012. In the slot machine 1010, the effect of the unit game is performed through the display of an image, the output of a voice, and the output of a light.

In addition, a credit amount display unit (not shown) is displayed at the upper of the display window 1150, which displays the present credit amount. Wherein, the "credit" refers to a virtual gaming medium used in a game when betting. In addition, the credit amount display unit displays a total number of the credit owned by the player at present.

In addition, a broken number cash display unit (not shown) is displayed at the lower of the credit amount display unit. The broken number cash display unit displays broken number cash. The "broken number cash" means to cash which fails to be converted into the credit due to the sum of money input is not enough.

The IC card 1500 is inserted into the PTS terminal 1700, the credit amount display unit displays a credit amount stored by the IC card, and the broken number cash display unit displays broken number cash stored by the IC card. In addition, these numerical values are stored into the member management server 13 correspondingly to the identification code of the member card.

Wherein, the IC card is a non-contacting IC card in which an IC (Integrated Circuit) used to record and calculate various data such as a credit, which is able to perform a short distance wireless communication such as an NFC (Near Field Communication) based on a RFID (Radio Frequency Identification) technology. The player is able to own a data associated with the credit by using the IC card 1500 and carry the above IC card 1500 freely among different slot machines. Besides, the player is able to use the data associated with the credit (the data of sum of money) stored in the IC card 1500 to conduct a game such as a unit game in the slot machine 1010 through inserting the IC card 1500 into the PTS terminal 1700 of the slot machine 1010.

In addition, the player may also store the cash such a coin and a bill from the machinery disposed in the hall into the IC card 1500 by converting it into a cash data.

In addition, at the lower of the lower image display panel 1141, the PTS terminal 1700 is disposed in the cabinet 1011. Besides, speakers 1112 are disposed at the right and the left of the PTS terminal 1700 respectively, and a lamp 1111 is disposed at the upper of the top box 1012. In the slot machine 1010, an effect of the unit game is performed by an image display based on the upper image display panel 1131, a voice output based on the speaker 1112 and a light output based on the lamp 1111.

[The Structure of the Information Display Device 7: The Structure of PTS Terminal]

Figure 11:
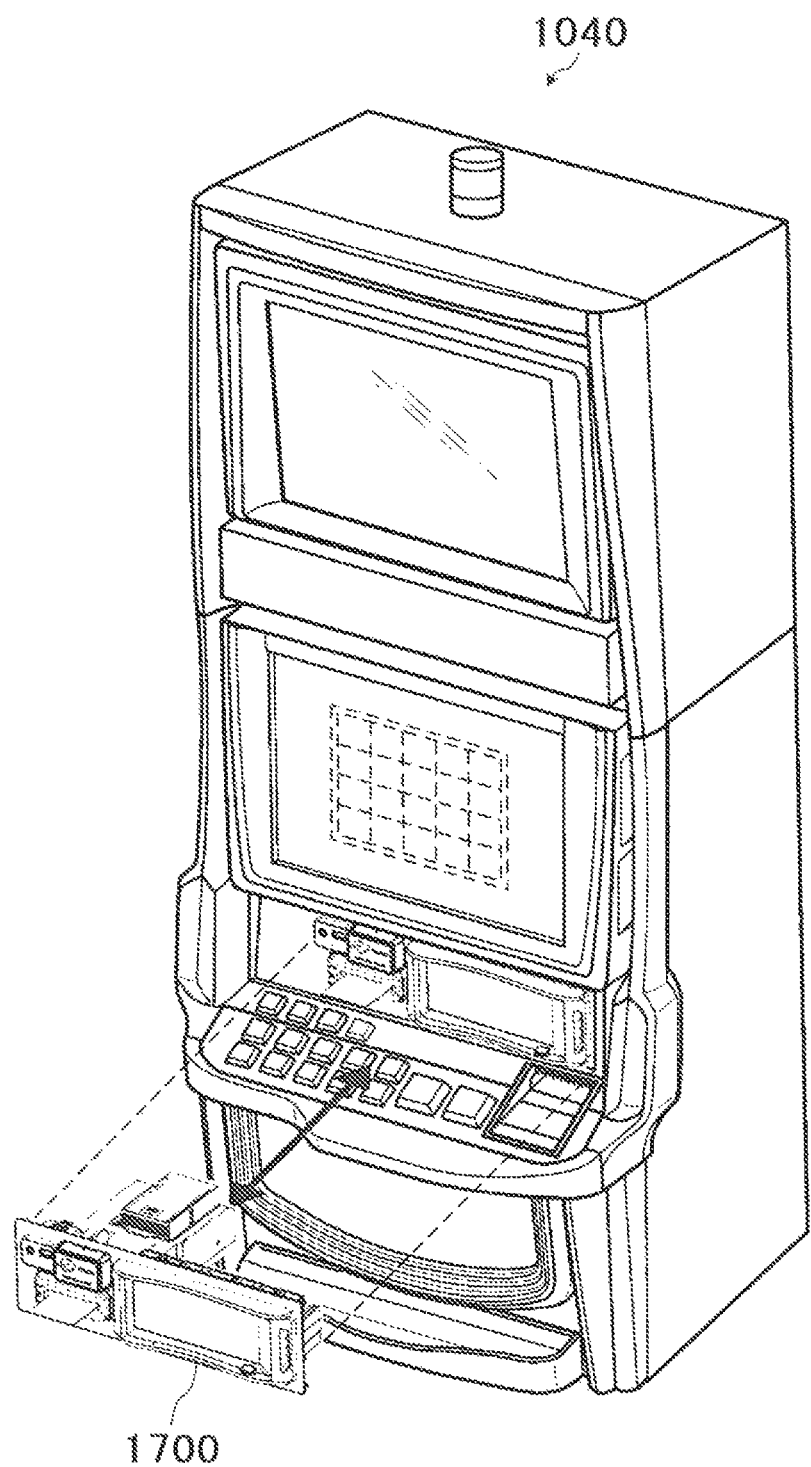
FIG. 11 is a diagram representing a PTS terminal arranged into a slot machine of an embodiment of the present invention.

FIG. 11 is a diagram representing the PTS terminal 1700 disposed in the slot machine 1010. The PTS terminal 1700 exchanges a data with the gaming machine through a universal data interface such that the PTS terminal 1700 is able to be disposed in different types of gaming machine of different manufacturers.

Figure 12:
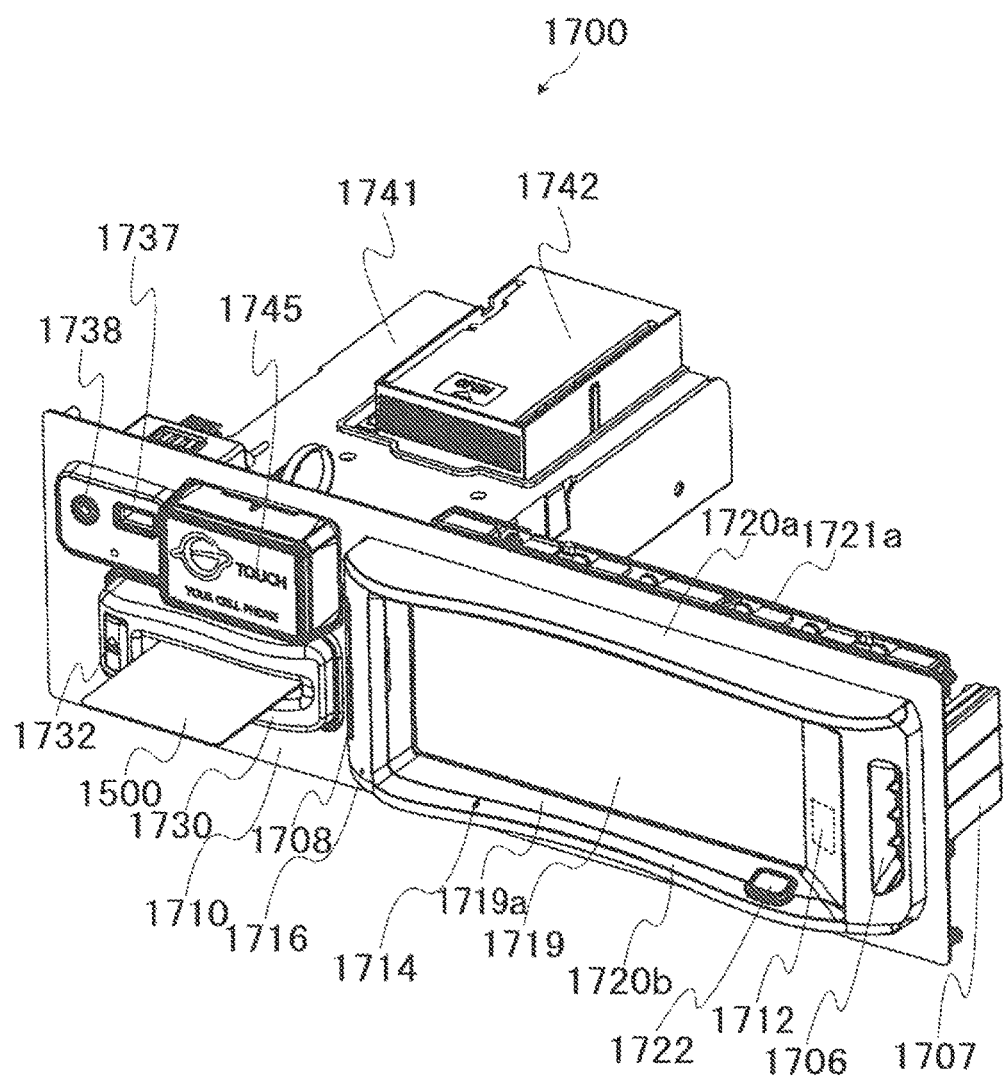
FIG. 12 is an enlarged diagram representing a PTS terminal of an embodiment of the present invention.

FIG. 12 is an enlarged diagram of the PTS terminal 1700 shown in FIG. 11. As shown in FIG. 12, the PTS terminal 1700 comprises a panel 1710, and various parts arranged on the front surface of the panel 1710 are able to be visually recognized by the player, while the parts arranged on the back surface of the panel 1710 are contained inside of the slot machine 1010, which are not be able to be visually recognized by the player.

An LCD 1719 comprising a touch panel function is disposed on the right of the front surface of the panel 1710. That is, the LCD 1719 functions as the display 73 which is able to display a plurality of information associated with the user and functions as the input device 74 which receives the input from the user. The LCD 1719 displays a member information and information provided to the member, and the picture size is 6.2 inch (about 15.7 cm). (about 15.7 cm). In addition, an LCD cover 1719a is disposed around the LCD 1719. In addition, in the above example, the LCD 1719 is configured to have the touch panel function and may also be configured to input the instruction of the player through a keyboard, a mouse, and other input device.

In addition, a luminous panel 1720a which is connected with an LED for emitting a light is disposed at the upper of the LCD 1719 and the LCD cover 1719a. The luminous panel 1720a is, for example, formed of a polycarbonate, which is connected with a plurality of (for example, seven) full color LEDs 1721a arranged at the inside of the panel 1710 and emits a light according to the full color LEDs 1721a shining.

Likewise, a luminous panel 1720b which is connected with an LED for emitting a light is disposed at the lower of the LCD 1719 and the LCD cover 1719a. The luminous panel 1720b is, for example, formed of the polycarbonate, which is connected with a plurality of (for example, seven) full color LEDs 1721b (not shown) arranged at the inside of the panel 1710 and emits a light according to the full color LEDs 1721b shining.

In addition, a camera window 1712 is disposed at the right of the LCD 1719, and a human body detecting camera 1713 (not shown) arranged at the inside of the LCD cover 1719a or the inside of the panel 1710 takes pictures of the player through the camera window 1712. For example, the camera window 1712 may be a half mirror material which is applied with a shield processing such a smoke.

In addition, a home button 1722 is disposed on the LCD cover 1719a at the lower right of the LCD 1719. The home button 1722 is a button which is used to change a picture displayed by the LCD 1719 to be a predetermined upper level picture.

Besides, a speaker duct 1706 is disposed on the LCD cover 1719a at the right of the LCD 1719, and a bass reflex type (bass reflex type) of speaker 1707 is disposed at a position of the inside of the panel 1710 correspondingly. Likewise, a speaker duct 1708 is disposed at the left of the LCD 1719, and a bass reflex type (bass reflex type) of speaker 1709 (not shown) is disposed at a position of the inside of the panel 1710 correspondingly. These speakers are dedicated speakers for the PTS terminal 1700, which are disposed separately from the speaker disposed in the slot machine 1010 for the slot machine game independently. These speakers may achieve an association effect and a voice communication, and may output a notification sound when forgetting to draw the IC card 1500. In addition, a sound from the speaker may be heard by the front (the player side) as a stereo after passing the above speaker ducts 1706 and 1708, and with such structure, a speaker may be disposed at the inside of the panel 1710 such that a space of the PTS terminal 1700 (of the panel surface) may be saved.

In addition, an opening part for microphone 1714 and an opening part for microphone 1716 are disposed in the LCD cover 1719a at the lower left of the LCD 1719, and microphones 1715 and 1717 (not shown) are respectively disposed at the inside of the LCD cover 1719a correspondingly.

A card insertion slot 1730 is disposed at the lower left of the front surface of the panel 1710 for inserting or drawing the IC card 1500. A full color LED 1731 (not shown) is disposed at a card insertion portion of the card insertion slot 1730, which may inform remaining sum of the IC card 1500 persisting in a card stacker 1742 described below through lightning various colors. An eject button 1732 is disposed in the card insertion slot 1730, and the position of the eject button 1732 and a step of the eject operation are clear through lightning a red LED 1733 (not shown) disposed near the eject button 1732.

In addition, a card unit 1741 and a card stacker 1742 are disposed at the position of the inside of the panel 1710 corresponding to the card insertion slot 1730, and the card insertion slot 1730 is configured to be a part of the card unit 1741. The card stacker 1742 reserve about 30 pieces of IC cards 1500 in advance, and if a new player performs a settlement after conducting a unit game, the IC cards 1500 reserved in the card stacker are taken out and arranged to the card insertion slot 1730.

When the IC card 1500 which is taken out from the card insertion slot 1730 and held in the card unit 1741 performs a settlement of the credit, the credit information is updated through the NFC, and then the IC card 1500 is exhausted from the card insertion slot 1730. During the player conducts a unit game, the IC card 1500 is fully accepted inside of the card unit 1741.

In addition, it may be further configured to be when the credit settlement is performed, even if the IC card 1500 exists, the IC card 1500 is put in the card stacker 1742 and reserved if the player is detected to be absent by a device such as a human detection camera. Thereby, for example, the IC card 1500 may not be held in the card unit 1741 for a long time, even if the play leaves with throwing the IC card 1500 due to clearly knowing that the remaining credit is not enough, or leaves with throwing the IC card 1500 due to forgetting to pick up the IC card 1500.

A USB terminal 1737 and an AUDIO terminal 1738 are disposed at the upper left of the front surface of the panel 1710. The USB terminal 1737 is configured to charge a device which is connected with the USB. In addition, the audio terminal 1738 is, for example, a terminal of four poles, and with a headset inserting therein, a conversation with the other party may be made through a headphone and a microphone. In addition, the AUDIO terminal 1738 is formed to be a terminal of two poles or three poles, and a voice may be listened through a headphone.

At the front surface of the panel 1710, a touch unit 1745 is disposed at the left of the LCD 1719. The touch unit 1745 includes a RFID module functioning as a writer and a reader, and wherein the writer writes a data into an IC device comprising an IC chip therein (for example, a non-contacting IC card, a portable phone having a communication function based on the NFC, a smart phone and the like) through a data communication, and the reader reads the data from the IC device through the data communication. That is, the touch unit 1745 functions as a reading card device 71 which may read the member card 2 owned by a user, and the member card 2 contains the user identification information for identifying the user. In addition, at four corners of the front surface of the touch unit 1745, LEDs 1746 (not shown) are arranged respectively. In addition, it may be configured to comprise an information record medium read device in addition to the touch unit 1745 or replacing the touch unit 1745, which is used to read information stored by an information record medium as a magnetic card. In this case, the magnetic card is regarded as the member card to replace the IC card 1500.

As mentioned above, various having a microphone function, a camera function, a speaker function, a display function and the like integrally form one unit, and thus the PTS terminal 1700 is able to achieve a purpose of saving space. According to the above structure, the following inconveniences may not occur that, for example, in the situation that various functions are arranged with separately devices, the speaker may not face the player if the LCD faces the player.

In addition, the PTS terminal 1700 is configured to read in the contents of the IC card 1500 through the card unit 1741 and take in the IC card 1500 as a whole and hold it inside of the PTS terminal 1700 when the IC card 1500 is inserted into the card insertion slot 1730. Besides, the touch unit 1745 is disposed, and with the structure, a data communication with the other IC card, a portable phone and a smart phone is made.

According to the above structure of the PTS terminal 1700, for example, during a player as a member conducts a game in the gaming machine (at this time, the member card is held in the card unit 1741), if a certain maintenance is required, the staff may cause the IC card for the maintenance to touch the above touch unit 1745 such that the LCD 1719 of the PTS terminal 1700 displays a picture for the maintenance, or the maintenance contents and history are sent to the server and accumulated.

In addition, for example, if a plurality of machines perform the maintenance at the same time, or a plurality of machines continuously perform the maintenance, and the following operations may be quickly performed that displaying a picture for the maintenance and logging the contents of the maintenance by causing the card for the maintenance to touch the above touch unit 1745 successively.

On the other hand, in the PTS terminal 1700, if a structure in which only the touch unit 1745 can access the IC card is adopted, it is difficult for the gaming machine to recognize the fact that the player is changed even if the other player uses the gaming machine, after the player who conducts a game with touching the IC card 1500 initially leaves the gaming machine. In order to eliminate the above inconveniences, the card unit 1741 which is used to hold the IC card 1500 during a game is also required. For example, after the player who conducts a game with touching the IC card 1500 initially leaves the gaming machine, the data associated with the credit may be stored in the IC card 1500 of the initial player when the other player (without using the IC card) puts into a bill, conducts a game in the gaming machine and performs a settlement.

[The Structure of the Information Display Device 7: The Circuit Structure of the Slot Machine]

Figure 13:
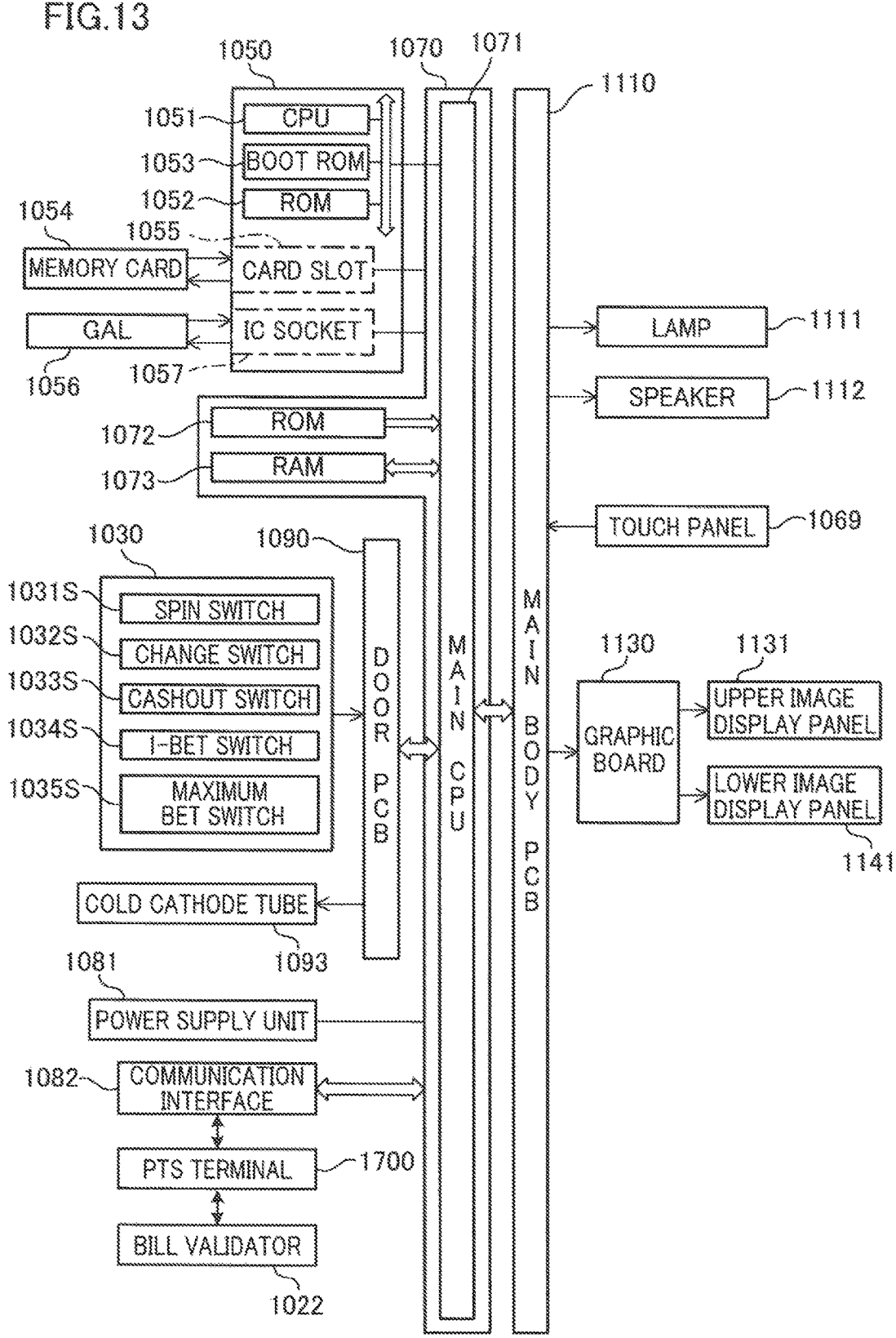
FIG. 13 is a diagram representing a circuit structure of a slot machine of an embodiment of the present invention.

Next, referring to FIG. 13, the structure of the circuit comprised in the slot machine 1010 is illustrated.

A gaming board 1050 comprises a CPU 1051, a ROM 1052, and a boot ROM 1053 connected with each other through an internal bus, a card slot 1055 corresponding to the memory card 1054, and an IC socket 1057 corresponding to a GAL (Generic Array Logic) 1056.

The memory card 1054 is constituted of a nonvolatile memory which stores a game program and a game system program. The game program contains a program related to an executing game progress and a program which is used to perform an effect based on an image and a sound. In addition, the above game program contains a symbol determination program. The symbol determination program is a program which is used to determine the symbols to be rearranged to a display block 1028.

In addition, the card slot 1055 is configured to insert and pull out the memory card 1054, which is connected onto the motherboard 1070 through an IDE bus. Therefore, the memory card 1054 is pulled out from the card slot 1055, and the other game program is written in the memory card 1054 and the memory card 1054 is inserted into the card slot 1055 such that the type and the contents of the game conducted in the slot machine 1010 may be changed.

The GAL 1056 is a PLD (Programmable Logic Device) which has an OR fixed array structure. The GAL 1056 comprises a plurality of input ports and output ports, and outputs a corresponding data from the output ports when a predetermined input is presented at the input ports.

In addition, the IC socket 1057 is configured to allow the GAL 1056 to be removable, which is connected onto the motherboard 1070 by a PCI bus. The contents of the game which is conducted in the slot machine 1010 may be changed by replacing the memory card 1054 with a memory card in which the other program is written, or rewriting the program written in the memory card 1054 to be other program.

The CPU 1051, the ROM 1052 and the boot ROM 1053 connected with each other through the internal bus are connected onto the motherboard 1070 through the PCI bus. The PCI bus is used to transmit a signal between the motherboard 1070 and the gaming board 1050, and supply a power to the gaming board 1050 from the motherboard 1070.

The ROM 1052 stores an authentication program. The boot ROM 1053 stores a preliminary authentication program, program used to start the preliminary program by the CPU 1051 (boot code) and the like.

The authentication program is a program which is used to authenticate the game program and the game system program (a falsification check program). The preliminary authentication program is a program which is used to authenticate the above authentication program. The authentication program and the preliminary authentication program describe a step (an authentication step) authenticating the fact that the program as an object is not tampered.

The motherboard 1070 is constituted of a commonly used motherboard in the market (a printed wiring board equipped with fundamental features of a personal computer), comprising a main CPU 1071, a ROM (Read Only Memory) 1072, a RAM (Random Access Memory) 1073, and a communication interface 1082. In addition, the motherboard 1070 corresponds to the controller 1100 in the present embodiment.

The ROM 1072 is constituted of a memory device such as a flash memory, in which a program such as a BIOS (Basic Input/Output System) performed by the main CPU 1071 and a permanent data. When the BIOS is performed by the main CPU 1071, an initialization processing is implemented to the predetermined peripheral device. In addition, a get-in processing starts to be performed to the game program and the game system program stored by the memory card 1054 through the gaming board 1050. In addition, in the present invention, the contents of the ROM 1072 may be rewritten and may also be forbidden to be rewritten.

The RAM 1073 stores a program such as a data used when the main CPU 1071 performs an operation and a symbol determination program. For example, the above program is stored when the get-in processing is performed to the aforementioned game program, game system program, and authentication program. In addition, the RAM 1073 is disposed with a working area used to work when the above program is executed. For example, the following areas are disposed: an area which is used to store a counted managing the number of times of execution of games, the BET amount, the payout amount, the credit amount and the like, and an area which is used to store a symbol (a code number) determined by drawing lots.

The communication interface 1082 is used to control a data transceiving between itself and the PTS terminal 1700. In addition, a door PCB (Printed Circuit Board) 1090 and a main body PCB 1110 described later are connected onto the motherboard 1070 through the USB respectively. In addition, a power supply unit 1081 is connected onto the motherboard 1070.

When a power is supplied to the motherboard 1070 by the power supply unit 1081, the main CPU 1071 of the motherboard 1070 starts, and a power is supplied to the gaming board 1050 through the PCI bus, and the CPU 1051 starts.

A door PCB 1090 and a main body PCB 1110 are connected with a peripheral device and control the operation of the peripheral device through an input device such as a switch, a sensor and the like, and the main CPU 1071.

The door PCB 1090 are connected with a control panel 1030 and a cold cathode tube 1093.

On the control panel 1030, a spin switch 10315, a change switch 1032S, a CASHOUT switch 1033S, a 1-BET switch 1034S, and a maximum BET switch 1035 are disposed correspondingly to the aforementioned various buttons. A signal is output to the main CPU 1071 when the respective switch detects that the corresponding button is pressed by the player.

The cold cathode tube 1093 functions as a back light disposed at the back side of an upper image display panel 1131 and a lower image display panel 1141, and lights the cold cathode tube 1093 according to a control signal output from the main CPU 1071.

The main body PCB 1110 is connected with a lamp 1111, a speaker 1112, a touch panel 1069, and a graphic board 1130. In addition, in the above example, a bill validator 1022 is connected on the PTS terminal 1700, but may also a structure which is connected with the slot machine 1010.

The lamp 1111 is lighted according to the control signal output from the main CPU 1071. The speaker 1112 outputs a sound such as a BGM according to the control signal output from the main CPU 1071.

The touch panel 1069 detects a position on the lower image display panel 1141 which is touched by a finger of the player and the like, outputs a signal corresponding to the position detected to the main CPU 1071.

The bill validator 1022 recognizes the bill and puts a genuine bill into the cabinet 1011. Then, the bill which is put into the cabinet 1011 is converted to be the credit, and an addition is performed to the credit converted as the credit owned by the player.

The graphic board 1130 controls the image display performed by the upper image display panel 1131 and the lower image display 1141 respectively according to the control signal output from the main CPU 1071. The graphic board 1130 comprises a video RAM and the like, which is used to store an image data generated by a VDP (Video Display Processor) which is used to generate the image data. In addition, the image data used when the VDP generates the image data is contained in the game program read out from the memory card 1054 and stored in the RAM 1073.

In addition, the graphic board 1130 comprises a video RAM and the like, which is used to temporarily store an image data generated by a VDP (Video Display Processor) which is used to generate the image data according to the control signal output from the main CPU 1071. In addition, the image data used when the VDP generates the image data is contained in the game program read out from the memory card 1054 and stored in the RAM 1073.

[The Structure of the Information Display Device 7: The Circuit Structure of the PTS Terminal]

Figure 14:
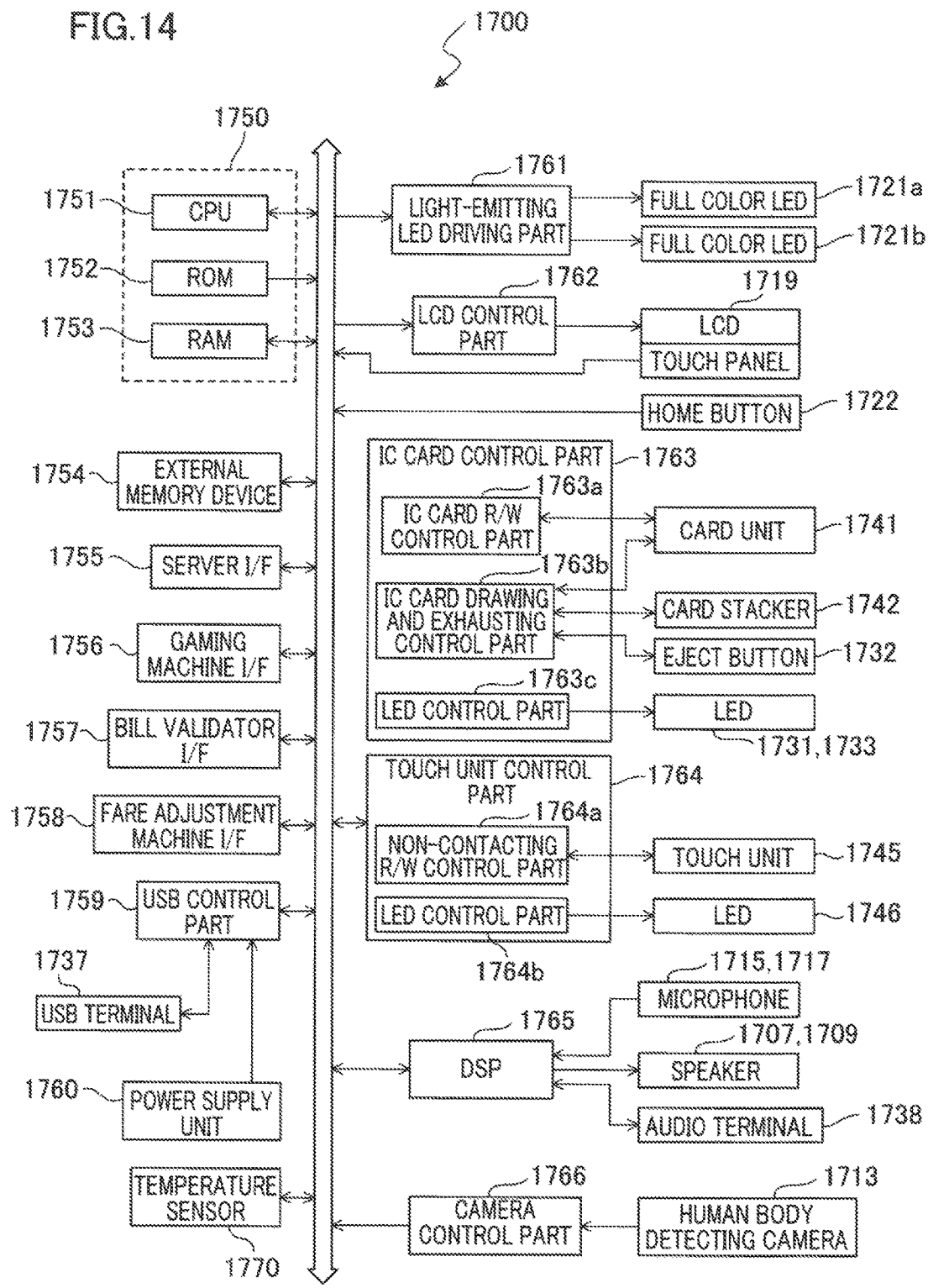
FIG. 14 is a diagram representing a circuit structure of a PTS terminal of an embodiment of the present invention.

Next, referring to FIG. 14, the structure of the circuit comprised in the PTS terminal 1700 is illustrated.

A PTS controller 1750 controlling the PTS terminal 1700 comprises a CPU 1751, a ROM 1752, and a RAM 1753. The PTS controller 1750 as the controller 70 has the function of an information acquiring processing part 701, a displaying control processing part 702, and an information switching processing part 703.

The CPU 1751 controls various components of the PTS terminal 1700, and executes or computes various programs stored in the ROM 1752. For example, the CPU 1751 updates the data associated with the credit stored by the IC card 1500 by performing a credit update program.

The ROM 1752 is constituted of a memory device such as a flash memory, storing a permanent data performed by the CPU 1751 therein. For example, the ROM 1752 may store a cooperation effect control program performed according to a request such as the credit update program therein, and the credit update program rewrites the data associated with the credit stored in the IC card 1500.

The RAM 1753 temporarily stores a data required when various programs stored in the ROM 1752 are executed.

An external memory device 1754 is, for example, a memory device such as a hard disk device, which is used to store the program executed by the CPU 1751 and the data used in the program executed by the CPU 1751.

A server I/F (interface) 1755 functions as an accessing device 72 which is used to achieve the data communication between a server such as the member management server 13 and the PTS terminal 1700. A gaming machine I/F (interface) 1756 is used to achieve the data communication between the controller 1100 of the slot machine 1010 and the PTS terminal 1700, and the data communication uses a specified protocol.

In addition, the PTS terminal 1700 connects the bill validator 1022 through a bill validator I/F (interface) 1757, connects a settlement machine 1868 through a fare adjustment machine I/F (interface) 1758, and performs a transceiving of data according to requirements.

A USB control part 1759 judges whether a power from a power supply part 1760 is provided in a USB terminal 1737, and the USB terminal 1737 may be charged when a predetermined condition is satisfied. When the predetermined condition is satisfied, the player may connect an electronic device to the USB terminal 1737 and charge the electronic device.

A light-emitting LED driving part 1761 starts a request according to a cooperation effect from a bonus server 11, controls a full color LED 1721*a* to light itself at a predetermined timing so as to cause a luminous panel 1720*a* at the upper of the LCD 1719 to gives out light, and control the full color LED 1721*b* to light itself at a predetermined timing so as to cause a luminous panel 1720*b* at the lower of the LCD 1719 to gives out light.

An LCD control unit 1762 controls the LCD 1719 to display the information of the member, the information provided to the member and the like, or display the data read from the IC card 1500 and the data input by the player. In addition, the LCD 1719 has a touch panel function, and sends a predetermined signal to the CPU 1751 when the player operates the touch panel.

A home button 1722 is disposed near the LCD 1719, which is used to change the picture displayed by the LCD 1719 into a predetermined upper level picture. When the player presses the home button 1722, the operation of the player is sent to the CPU 1751, and the CPU 1751 sends an instruction to the LCD control unit 1762 according to the operation to update the display of the LCD 1719.

An IC card control unit 1763 controls the insertion and exhausting of the IC card 1500, the writing in of the credit data and the like. The IC card control unit 1763 comprises an IC card (read writer) control part 1763*a*, an IC card drawing and exhausting control part 1763*b*, and an LED control part 1763*c*.

The IC card R/W control part 1763*a* controls the card unit 1741 to update the data associated with the credit stored in the IC card 1500. In addition, when the IC card 1500 is reissued, the data associated with the credit corresponding to the sum after performing the settlement is stored. The card unit 1741 has an antenna member which is used to read a data from the IC card 1500 or write a data into the IC card 1500 through the NFC and the like.

The card unit 1741 comprises a function as an IC card reader which is used to read the information stored in the IC card 1500 and a function as an IC card writer which is used to write the information into the IC card 1500, and may also comprise one of the above functions according to requirements.

The IC card drawing and exhausting control part 1763*b* controls the drawing and exhausting of the IC card 1500. When the player inserts the IC card 1500 into the card insertion slot 1730, a control is performed such that the IC card is held in the card unit 1741 during the player conducts a game. In addition, after the data associated with the credit when performing the settlement, a control is performed such that the IC card 1500 is exhausted. Besides, after the eject button 1732 is pressed, the IC card 1500 is exhausted.

In addition, when the IC card 1500 is reissued, the IC card 1500 is retaken out from the card stacker 1742, and the IC card 1500 is provided to the card unit 1741 so as to store the data associated with the credit.

The LED control part 1763*c* performs a control to light the LED (the full color LED 1731) disposed near the card insertion slot 1730 of the card unit 1741, and performs a control to light the LED (the red LED 1733) disposed near the eject button 1732.

The touch unit control part 1764 controls the data transceiving which is performed when touching the IC card 1500, a portable phone, a smart phone and the like. The touch unit control part 1764 comprises the non-contacting R/W (reader writer) control part 1764*a* and the LED control part 1764*b*.

The non-contacting R/W control part 1764*a* judges whether the IC card 1500 or the portable phone approaches to a predetermined distance (for example, performing a touch control operation) on the touch unit 1745, and if approaching to the predetermined distance, a result or the like is obtained from the touch unit 1745. The touch unit 1745 has an antenna member which is used to perform the data transceiving between the touch unit 1745 and the IC card 1500, the portable phone through the NFC and the like.

The touch unit 1745 comprises a function as the IC card reader which is used to read the information stored in the IC card 1500 and the portable phone and a function as the IC card writer which is used to write the information into the IC card 1500 and the portable phone, and may also comprise one of the above functions according to requirements.

The LED control part 1764b controls the LEDs 1746 which are arranged at the four corners of the front surface of the touch unit 1745 to light themselves at a predetermined timing.

A DSP 1765 receives a voice data from the microphones 1715 and 1717, and sends the data to the CPU 1751 after performing a predetermined voice processing on it. In addition, the DSP 1765 sends the voice data received to the speakers 1707 and 1709. Besides, the DSP 1765 outputs the voice received to the headphone for the AUDIO terminal connected with the headset, and sends the voice received from the microphone after being processed. In addition, a summary structure thereof is illustrated in the present embodiment, in which an A/D converter, a D/A converter, an amplifier and the like are omitted.

The camera control part 1766 acquires the image of the player or the like taken by the human body detecting camera 1713, and performs a predetermined image processing according to requirements and sends the data after being processed to the CPU 1751. The data is sent to the member management server 13 or the like through the server I/F 1755, for example.

The temperature sensor 1770 measures the temperature data of the CPU 1751, the motherboard (not shown), the external memory device 1754, the LDC control part 1762 and the like in real time. In addition, the temperature sensor 1770 may adopt the temperature sensor disposed on the motherboard, and may also adopt a dedicated thermometer which is used to acquire a temperature.

[The Structure of the Information Display Device 7: The Structure of the Signage]

Figure 15:
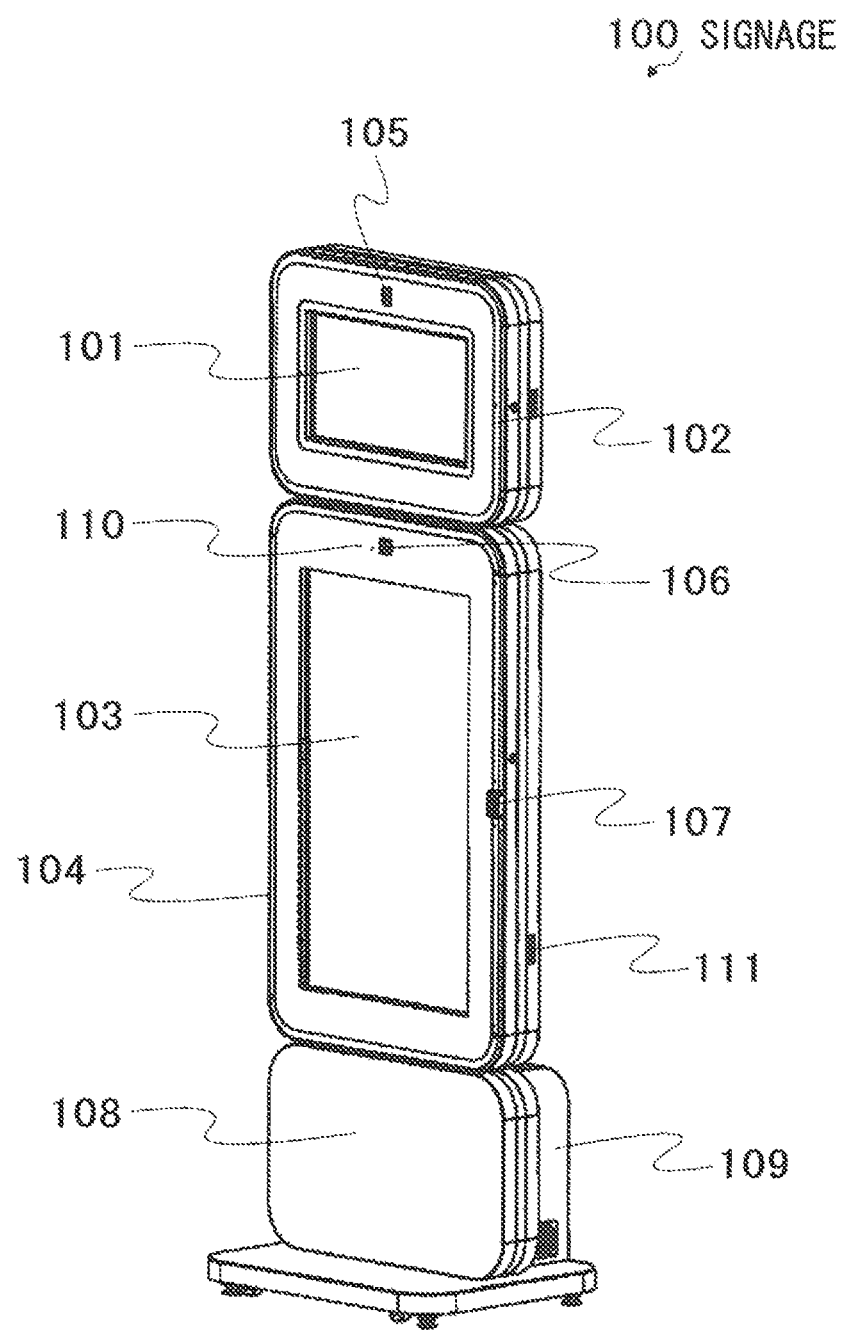
FIG. 15 is a diagram representing an overall structure of a signage of an embodiment of the present invention.

FIG. 15 represents the signage 100. The signage 100 is mainly an information display device which is used to display an advertisement (advertising board) of a shop, a floor guide of a hall and the like, which connects a server such as the member management server 13 through the network.

The signage 100 comprises an LCD 101 and an LCD 103 having a touch panel function. The LCD 103 functions as the display 73 which may display a plurality of information associated with the user. In addition, the LCD 103 functions as the input device 74 receiving the input from the user. In addition, the LCD 101 may also comprise the function of the display 73. The LCD 101, for example, is a liquid crystal display device of 24 inches (about 60.96 cm), and the LCD 103, for example, is a liquid crystal display device of 46 inches (about 116.84 cm), and as mentioned above, theses LCDs display an advertisement information, a guide information and the like. In addition, the touch panel function comprised in the LCD 103, for example, is a touch panel which uses an infrared ray. In addition, in the above example, the LCD 103 is configured to comprise the touch panel function, and may also be configured to input an instruction through a keyboard, a mouse and the other input devices.

The LCD 101 and LCD 103 are accepted in the cabinet respectively, and effect LEDs 102 and 104 used to perform an effect are disposed around the front surface of the cabinet respectively. The effect LEDs 102 and 104 are, for example, the LED lights on a tape.

Besides, in the signage 100, the cabinets of the LCD 101 and LCD 103 respectively comprise motion sensors 105 and 106. The motion sensors 105 and 106, for example, are cameras, and the action of the user of the signage 100 and the customer going through the passageway is analyzed with the video taken by the motion sensors 105 and 106.

The signage 100 further comprises the touch unit 107, and further comprises a RFID module which may performs a data communication with the portable phone and the smart phone, and the above portable phone comprises a communication function based on the non-contacting IC card or the NFC. That is, the touch unit 107 functions as the reading card device 71 which may read the member card 2 owned by the user, and the member card 2 contains the user identification information for identifying the user. The member places the member card (IC card) associated therewith onto the above touch unit 107, and logs in by inputting a PIN code and the like, and thus it may cause the LCD 101 or the LCD 103 to display a menu screen for the member and the information related to the member. The information of the member, for example, may be acquired from the member management server 13.

In addition, the staff of the hall may place the IC card of the staff thereon, logging in by inputting the PIN code and the like, and causing the LCD 101 or the LCD 103 to display the menu screen and the like for the staff.

Comparing with the PTS terminal 1700, the signage 100 does not comprise a card unit which is used to hold the IC card 1500, but only comprises the touch unit 107. However, the signage 100 is configured to be that the user does not log off but directly leaves after touching the IC card, even in this case, the information of the member displayed on the LCD 103 and the like due to touching the IC card may not be displayed and longer after a predetermined time, logging off automatically.

Besides, the signage 100 comprises a microphone 133 which is used to acquire a voice in the cabinet of the LCD. An opening for microphone 110 is disposed in the cabinet of the LCD 103, and the opening for microphone 110 corresponds to the position at which the microphone is disposed. In FIG. 15, a lateral side of the motion sensor 106 shows the above opening for microphone 110.

In addition, the signage 100 comprises speakers 134 and 135 which are used to output voice in the cabinet of the LCD 103. Speaker ducts are disposed in the cabinet of the LCD 103, and the speaker ducts correspond to the positions at which the speakers are disposed respectively. In FIG. 15, it shows a speaker duct 111 corresponding to one speaker.

In addition, the signage 100 comprises a base unit 108, a cabinet supporting the LCD 101 and LCD 103, and a control part 109 accepting the control part which is used to control various LCD, LED and the like.

[The Structure of the Information Display Device 7: The Circuit Structure of the Signage]

Figure 16:
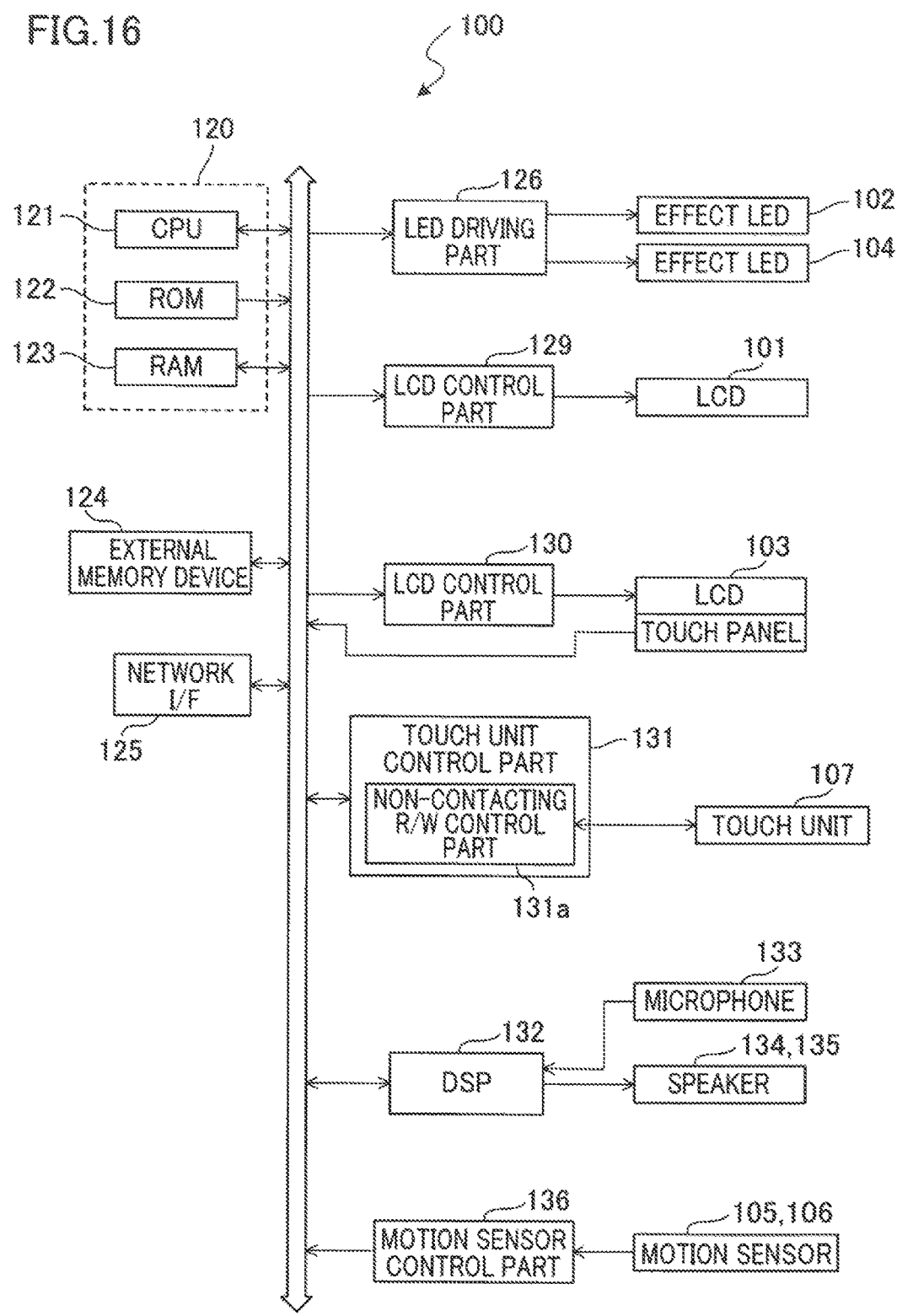
FIG. 16 is a diagram representing a circuit structure of a signage of an embodiment of the present invention.

Next, referring to FIG. 16, the structure of the circuit comprised in the signage 100 is illustrated.

A signage controller 120 controlling the signage 100 comprises a CPU 121, a ROM 122 and a RAM 123. The signage controller 120 as the controller 70 comprises functions of an information acquiring processing part 701, a displaying control processing part 702, and an information switching processing part 703.

The CPU 121 controls various components of the signage and executes or computes various programs stored in the ROM 122.

The ROM 122 is constituted of a memory device such as a flash memory, storing a permanent data executed by the CPU 121 therein. For example, the cooperation effect control program or the like which is performed according to a request from the bonus server 11 is stored.

The RAM 123 temporarily stores the data required when the various programs stored in the ROM 122 are performed.

An external memory device 124, for example, is a memory device such as a hard disk device, which is used to store the program executed by the CPU 121 and the data used in the program which is executed by the CPU 121.

A network I/F (interface) 125 functions as the accessing device 72 which is used to achieve the data communication between the server such as the member management server 13 and the PTS terminal 1700.

An LED driving part 126 controls the effect LEDs 102 and 104 to be lighted at a predetermined timing according to the cooperation effect start request from external. In addition, the effect LEDs 102 and 104 give out light synchronously with the display of the advertisement information, the display of the guide information, the display of the member information based on the operation of the member and the like.

The LCD control part 129 controls the LCD 101 to display the information such as the above advertisement information. In addition, the LCD control part 129 may control the LCD 101 to display a floor map.

The LCD control part 130 controls the LCD 103 to display the information such as the above advertisement information. In addition, the LCD 103 comprises a touch panel function, and the operation from the user is sent to CPU 121.

The touch unit control part 131 controls the data transceiving performed based on the touch control operation of the IC card or the portable phone in the touch unit 107. The touch unit control part 131 comprises a non-contacting R/W (reader writer) control part 131*a*.

The non-contacting R/W control part 131*a* judges whether the touch control operation is performed by the IC card or the portable phone on the touch unit 107, and if the touch control operation is performed, a read result or the like is acquired from the touch unit 107. The touch unit 107 has an antenna member which is used to perform the data transveiving between the touch unit 1745 and the IC card, the portable phone through the NFC and the like.

When the CPU 121 acquires the identification code of the member card (IC card) from the touch unit 107, the information of the member corresponding to the identification code is acquired from the member management server 13 and displayed onto the LCD 101 or the LCD 103. In addition, the operating menu used by the above member may be further displayed onto the LCD 103, or the advertisement information adapted to the above member is displayed onto the LCD 101 or the LCD 103.

The DSP 132 receives a voice data from the microphone 133, and sends the data to the CPU 121 after a predetermined processing on it. In addition, the DSP 132 sends the voice data received to the speakers 134 and 135 so as to output it.

A motion sensor control part 136 acquires the image of the user and the like received by the motion sensors (for example, camera) 105 and 106, performs a predetermined image processing according to requirements, and sends the data after being processed to the CPU 121.

[The Structure of the Information Display Device 7: The Structure of the Kiosk Terminal]

Figure 17:
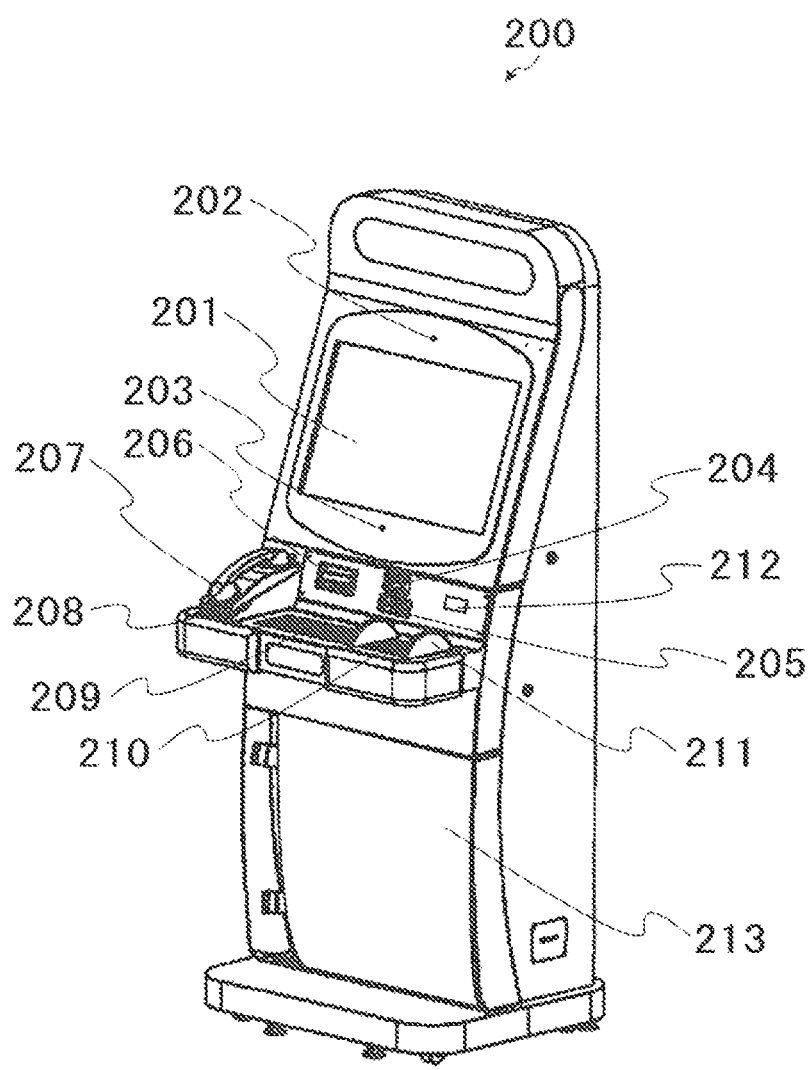
FIG. 17 is a diagram representing an overall structure of a kiosk terminal of an embodiment of the present invention.

FIG. 17 shows the KIOSK terminal 200. The kiosk terminal 200 is mainly an information display device which is used to display the information related to the game conducted in the hall, and for example, is connected with a server such as the member management server 13 through the network, and wherein the information related to the above game is, for example, the start of the bonus game, the countdown when the bonus game starts, the winning ranking today, the popularity machine ranking, and so on.

The kiosk terminal 200 comprises an LCD 201 which comprises the touch panel function. That is, the LCD 201 functions as the display 73 which may display a plurality of information associated with the user, and functions as the input device 74 which receives the input from the user. The LCD 201 is, for example, a liquid crystal display device of 24 inches (about 60.96 cm), and as mentioned above the LCD displays the information related to the game conducted in the hall and the like. In addition, in the above example, the LCD 201 is configured to comprise the touch panel function, and may be further configured to input an instruction through a keyboard, a mouse, and other input devices.

Besides, the kiosk terminal 200 comprises a motion sensors 202 and 203 at the upper and the lower of the LCD 201 respectively. The motion sensors 202 and 203 are, for example, cameras, and analyzes the action of the user of the kiosk terminal 200 and the customer going through the passageway with the video taken by the motion sensors 202 and 203.

The kiosk terminal 200 further comprises a touch unit 204 and also comprises a RFID module which may perform a data communication with the portable phone and the smart phone, and the above portable phone comprises a communication function based on the non-contacting IC card or the NFC. That is, the touch unit 204 functions as the reading card device 71 which may read the member card 2 owned by the used, and the member card 2 contains a user identification information for identifying the user. The member places the member card (IC card) associated therewith onto the touch unit 204, and logs in by inputting the PIN code, and thus the LCD 202 may display a menu screen for the member and the information related to the member. The information of the member, for example, may be acquired from the member management server 13. In addition, it may be configured to comprise an information record medium read device which is used to read the information stored in the information record medium such as a magnetic card, in addition to the touch unit 204, or replacing the touch unit 204. In this case, the magnetic card may be regarded as the member card to replace the IC card 1500.

In addition, the staff of the hall may place the IC card of the staff thereon, logging in by inputting the PIN code, and causing the LCD 201 to display the menu screen for the staff and the like.

Besides, the kiosk terminal 200 is disposed with a card insertion slot 205, which may insert or exhaust the IC card 1500. The card insertion slot 205 is disposed with an eject button. In addition, a card unit 230 is disposed inside of the KIOSK cabinet corresponding to the card insertion slot 205, which constitutes a part of the card unit 230.

When the member card is inserted from the card insertion slot 205, it may cause the LCD 201 to display the menu screen for the member and the information related to the member. In addition, the card unit 230 is able to issue and recover a limited card and a reward card.

In addition, the kiosk terminal 200 comprises a ticket printer 206. The ticket printer 206 is able to issue and recover a ticket and a coupon, and may be configured to comprise the function of the bill validator.

Besides, the kiosk terminal 200 comprises a telephone receiver 207 which is used when performing a VoIP conversation. The user of the kiosk terminal 200 may make a conversation with other user of the kiosk terminal 200 or the player of the gaming machine through the telephone receiver 207. In addition, if there is an incoming call of the VoIP conversation, an incoming call display LED 208 is controlled to give out light.

The kiosk terminal 200 further comprises a keyboard 209 and a numeric keypad 210 used when the user input the data (when the member logs in or text chats), and LED panels 211 preventing prying are disposed at both sides of the numeric keypad 210.

Besides, the kiosk terminal 200 is disposed with a QR code (registered trademark) scanner 212 which is used to read a QR code, which may read the QR code attached in the mail which is sent to the portable phone and the like.

In addition to this, the kiosk terminal 200 comprises a accepting part 213 which is used to accept the control part used to control the LCD, the LED and the like.

[The Structure of the Information Display Device 7: The Circuit Structure of the Kiosk Terminal]

Figure 18:
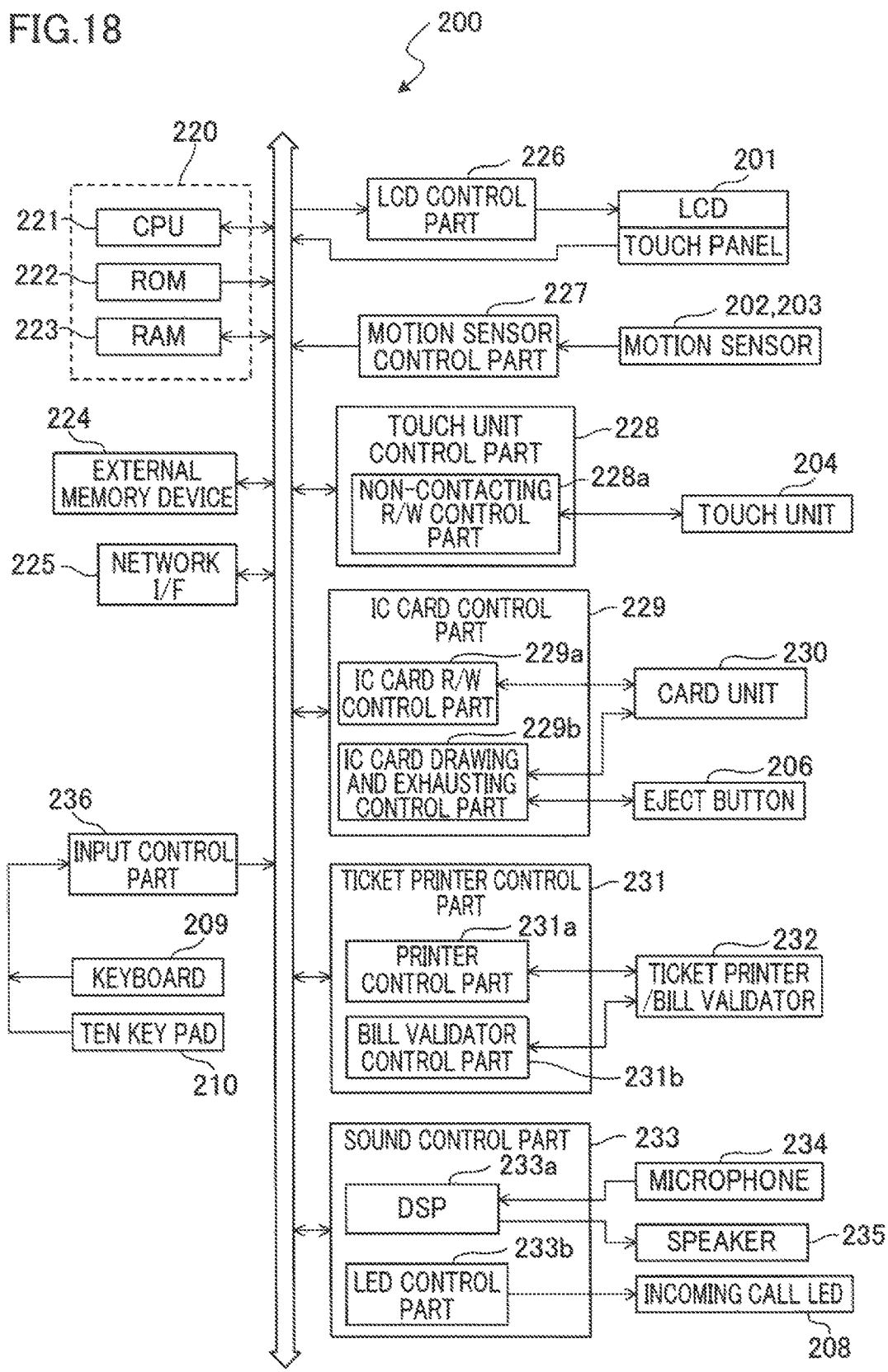
FIG. 18 is a diagram representing a circuit structure of a kiosk terminal of an embodiment of the present invention.

Next, referring to FIG. 18, the structure of the circuit comprised in the kiosk terminal 200 is illustrated.

The kiosk terminal controller 220 controlling the kiosk terminal 200 comprises a CPU 221, a ROM 222 and a RAM 223. The kiosk terminal controller 220 as the controller 70 comprises functions of the information acquiring processing part 701, the displaying control processing part 702, and the information switching processing part 703.

The CPU 221 controls various components of the kiosk terminal and executes or computes various programs stored in the ROM 222.

The ROM 222 is constituted of a memory device such as a flash memory, storing a permanent data executed by the CPU 221 therein. For example, a VoIP conversation control program or the like may be stored.

The RAM 223 temporarily stores the data required when the various programs stored in the ROM 222 are performed.

An external memory device 224, for example, is a memory device such as a hard disk device, which is used to store the program executed by the CPU 221 and the data used in the program which is executed by the CPU 221.

A network I/F (interface) 225 functions as the accessing device 72 which is used to achieve the data communication between the server such as the member management server 13 and the PTS terminal 1700.

The LCD control part 226 controls the LCD 201 to display the information such as the above game information. In addition, the LCD 201 comprises a touch panel function, and the operation from the user is sent to CPU 221.

In addition, the LCD control part 226 may control the LCD 201 to display a floor map.

A motion sensor control part 227 acquires the image of the user and the like received by the motion sensors (for example, camera) 202 and 203, performs a predetermined image processing according to requirements, and sends the data after being processed to the CPU 221.

The touch unit control part 228 controls the data transceiving performed based on the touch control operation of the IC card or the portable phone in the touch unit 204. The touch unit control part 228 comprises a non-contacting R/W (reader writer) control part 228a.

The non-contacting R/W control part 228a judges whether the touch control operation is performed by the IC card or the portable phone on the touch unit 204, and if the touch control operation is performed, a read result or the like is acquired from the touch unit 204. The touch unit 204 has an antenna member which is used to perform the data transveiving between itself and the IC card, the portable phone through the NFC and the like.

In addition, an IC card control part 229 controls the insertion and exhausting of the IC card 1500, the reading of the data and the like. The IC card control part 229 comprises an IC card R/W (read writer) control part 229a and an IC card drawing and exhausting control part 229b.

The IC card R/W control part 229a controls the card unit 230 to read the identification code and the like stored in the IC card 1500. The card unit 230 has an antenna member which is used to write a data into the IC card 1500 through the NFC and the like.

The IC card drawing and exhausting control part 229b controls the drawing and exhausting of the IC card 1500. When the user inserts the IC card 1500 into the card insertion slot 205, a control is performed such that the IC card is held in the card unit 230 before the user logs off. Besides, after the eject button is pressed, the IC card 1500 is exhausted.

The ticket printer control part 231 controls the ticket printer/bill validator 232 to issue and recover the ticket and the coupon and recognize the bill or the like. The ticket printer control part 231 comprises a printer control part 231a and a bill validator control part 231b.

A sound control part 233 uses the microphone 234 and the speaker 235 comprised in the telephone receiver 207 to output the sound. The sound control part 233 comprises a DSP 233a and an LED control part 233b. Regarding to the sound input from the microphone 234 and the sound output from the speaker 235, the DSP 233a performs a predetermined audio signal processing and a control. The LED control part 233b controls the incoming call display LED 208 to give out light according to an incoming call signal such as the VoIP conversation.

An input control part 236 converts the input performed by the user through the keyboard 209 and the input performed by the user through the numeric keypad 210 into a signal and then sends to the CPU 221.

[The Structure of the Information Display Device 7: The Display State of the Display 73]

As mentioned above, as the information display device 7, the PTS terminal 1700, the signage 100 and the kiosk terminal 200 comprises an LCD 1719, an LCD 103, and an LCD 201 as the display 73 respectively. In addition, the above information display device 7 comprises the touch unit 1745, the touch unit 107 and the touch unit 204 as the reading card device 71. When the reading card device 71 of the above information display device 7 reads in the member card 2, the information which is set to not require to be authenticated (the information not requiring to be authenticated) is displayed on the display 73 without being logged in.

[The Structure of the Information Display Device 7: The Display State of the Display 73: The Information not Requiring to be Authenticated Display Screen]

Figure 19:
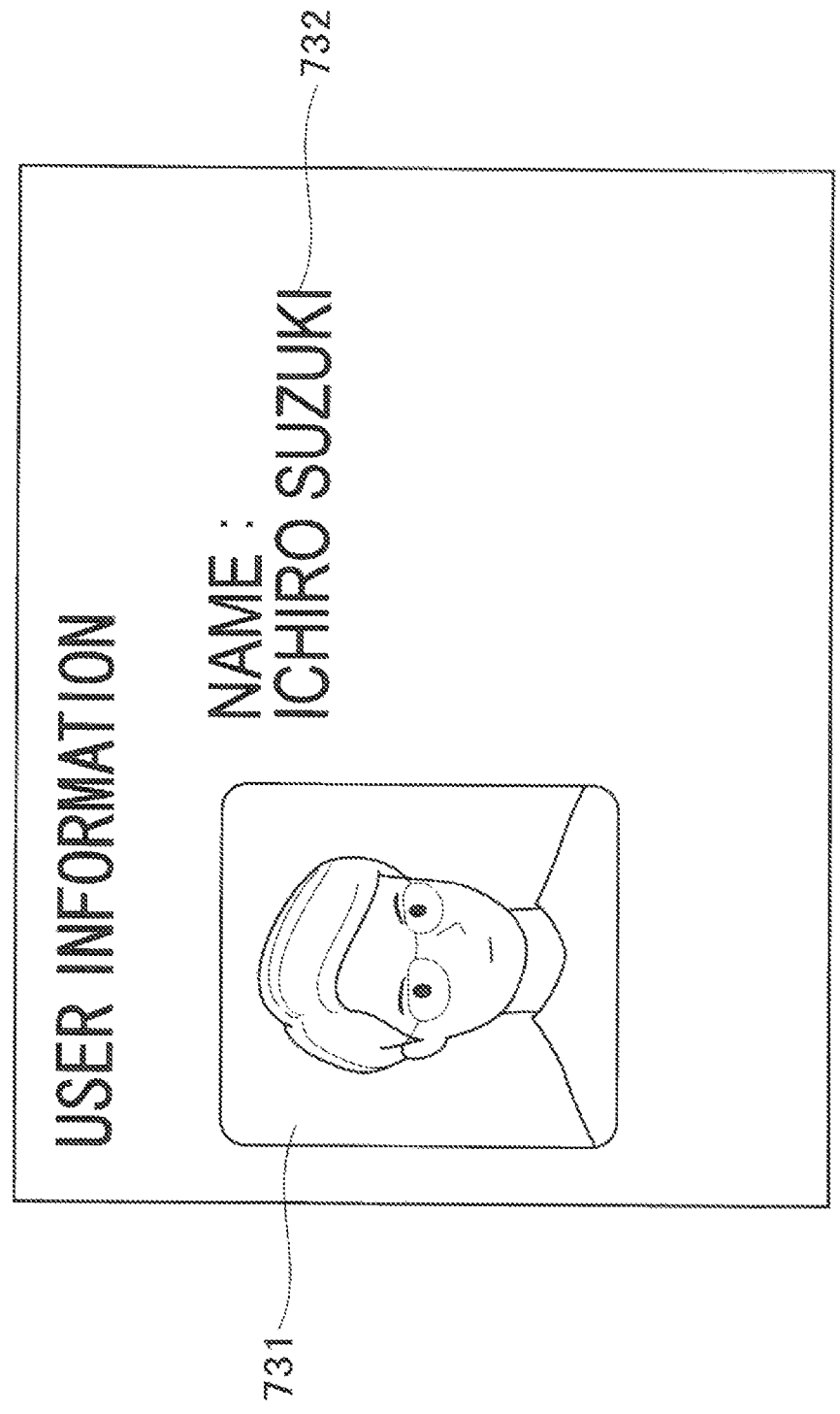
FIG. 19 is a diagram representing an example of a display screen without a confirming information of an embodiment of the present invention.

FIG. 19 represents an example of the information not requiring to be authenticated display screen which is used to display the information which is set to not require to be authenticated. In this example, in a plurality of information associated with the user, the facial image of the user and the name image of the user are set to not require to be authenticated. As shown in FIG. 19, a user image 731 which is used to represent the facial image of the user and a user name image 732 which is used to represent the name of the user are displayed in the information not requiring to be authenticated display screen.

[The Structure of the Information Display Device 7: The Display State of the Display 73: The Authentication Setting Picture]

The information display device 7 is configured to set some of the plurality information associated with the user to be the information not requiring to be authenticated. The authentication setting picture which is used to perform the above setting is displayed through logging in the information display device 7.

Figure 20:
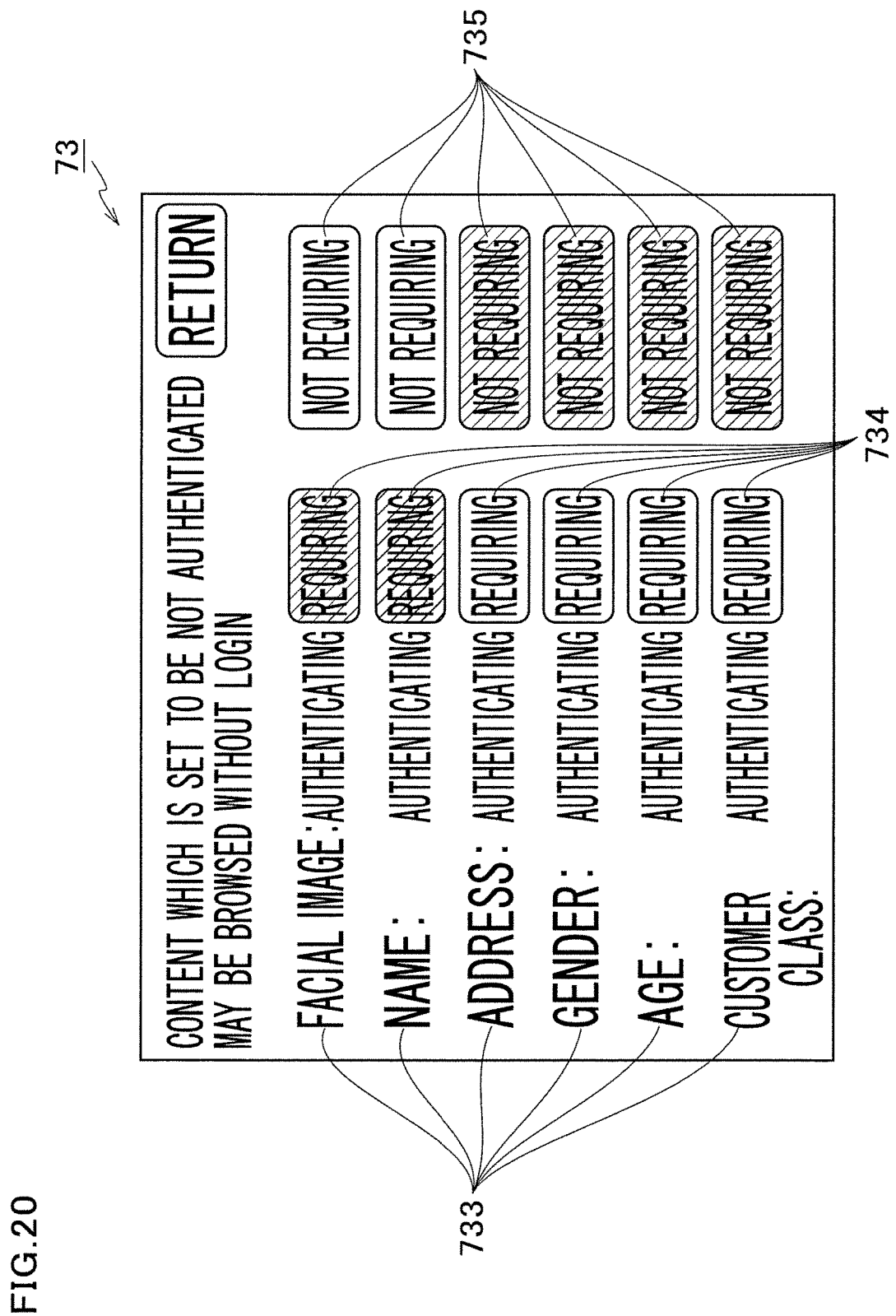
FIG. 20 is a diagram representing an example of a confirmation setting picture of an embodiment of the present invention.

As shown in FIG. 20, in the authentication setting picture, the plurality of information associated with the user is displayed with a recognizable manner and it is displayed that whether an authentication is needed for the various information. To be more specific, in the authentication setting picture, a user information item 733 is displayed for each of the plurality of information associated with the user. Besides, a button of requiring an authentication 734 and a button of not requiring an authentication 735 are displayed for each user information item 733. If the button of requiring an authentication 734 is displayed with a form of gray out, the information of the item corresponding to the button of requiring an authentication 734 represents that it is not required to be authenticated. That is, the information of this item may be directly displayed without being logged in. In addition, if the button of not requiring an authentication 735 is displayed with the form of gray out, the information of the item corresponding to the button of not requiring an authentication 735 represents that it is required to be authenticated. That is, the information of this item may not be displayed if without being logged in.

When the button of requiring an authentication 734 which is displayed with the form of gray out is touched, the gray out display state of the button of requiring an authentication 734 is relieved, and the button of not requiring an authentication 735 of the corresponding item changes to be the gray out display state. For example, regarding to the item of the "facial image", when the button of requiring an authentication 734 is touched, the gray out display state of the button of requiring an authentication 734 is relieved, and the button of not requiring an authentication 735 of the corresponding item changes to be the gray out display state, and the user image 731 is not displayed in the information not requiring to be authenticated display screen. In addition, when the button of not requiring an authentication 735 which is displayed with the form of gray out is touched, the gray out display state of the button of not requiring an authentication 735 is relieved, and the button of requiring an authentication 734 of the corresponding item changes to be the gray out display state. For example, regarding to the item of "gender", when the button of not requiring an authentication 735 is touched, the gray out display state of the button of not requiring an authentication 735 is relieved, and the button of requiring an authentication 734 of the corresponding item changes to be the gray out display state. Thereby, the gender information of the user is displayed in the information not requiring to be authenticated display screen.

In addition, there is no limitation to that all of the plurality of the information associated with the user are able to be set whether an authentication is needed. For example, it may be configured that it may not be set to not require an authentication for an important user information such as a domicile and a credit number. In addition, it is also allowed that a user information which may not be set to require an authentication exists. For example, it may be configured that the information of the name and the facial image must be displayed in the information not requiring to be authenticated display screen.

In addition, for example, public levels are set for the plurality of information associated with the user respectively. That is, it may be configured that the information not requiring to be authenticated may be selected easily through the user specifying the public level thereof. To be more specific, the user information not requiring an authentication which may not be set by the user is preset to be the level of a first predetermined value (for example, the public level is 0), the user information requiring an authentication which may not be set by the user is preset to be the level of a second predetermined value greater than the above predetermined value (for example, the public level is 10), and the other user information is preset to be the level of a value greater than the first predetermined value and smaller than the second predetermined value (for example, 1-9 as the degree of importance from small to large). Then, the user selects the public level from the values greater than the first predetermined value and smaller than the second predetermined value. The public level selected is stored in the member management server 13 and the like. Besides, the information display device 7 may be configured to acquire the plurality of information associated with the user and the public level corresponding to the user of the member card 2 at the same time when the member card 2 is read in, and the user information with a public level no more than this public level may be directly displayed in the display 73 without the authentication such as logging in.

[Member Management Table]

FIG. 21 is a diagram representing an example of the member management table. The member management table is stored in the member management server 13 and the like. In the member management table, a plurality of information associated with the user is stored correspondingly to the member identification code which may identify the member, for example, a member name representing the name of the member, an image data representing the face of the member, a domicile of the member, a gender of the member, a customer class representing the class that the member pertains, and so on. In addition, for each of the plurality of the information associated with the user, a situation representing that whether it is required to be authenticated is stored.

For example, for the data of "member name", a "requiring" or a "not requiring" is stored in the column of "member name authentication". If the "requiring" is stored in the column of the "member name authentication", the "member name" may not be displayed only by causing the reading card device 71 (the touch unit 1745 and the like) of the information display device 7 to read in the member 2. That is, in order to display the "member name", a logging in is needed. If the "not requiring" is stored in the column of the "member name authentication", the "member name" may be displayed in the display 73 (the LCD 1719 and the like) only by causing the information acquiring processing part 701 of the information display device 7 to read in the member 2. That is, displaying the "member name" needs not a logging in. As mentioned above, when the information display device 7 reads in the member card 2, the information of the member management table is acquired by accessing the member management server 13, and the information nor requiring to be authenticated of the plurality of information associated with the user is displayed in the display 73.

As mentioned above, in the member management table, the plurality of information associated with the user is distinguished to be information not requiring to be authenticated and information requiring to be authenticated respectively and then is stored.

Basically, the member management table is updated when a dedicated counter uses the member card 2 issued by the card printing control device 3 to perform a member logging in. However, the customer class needs to be updated by the shop. For example, it may be updated according to a frequency to the shop, an action pattern and the like, and it may also be updated by the manager of the shop and the like.

In addition, a range which may decide whether an authentication is required may be determined according to the information stored in the member management table. For example, it may be configured to be that a customer class pertains a member of VIP, the all user information of which may perform an authentication setting, a customer class pertains a member of MEMBER, only a part of the user information of which may perform the authentication setting, and a customer class pertains a member of VISITOR, the user information of which may not perform the authentication setting.

[The Contents of the Program Executed by the Card Printing Control Device]

Next, a processing (program) executed by the card printing control device 3 (the CPU of the controller 300 and the like) is illustrated.

[The Issuing Processing of a Card]

Figure 22:
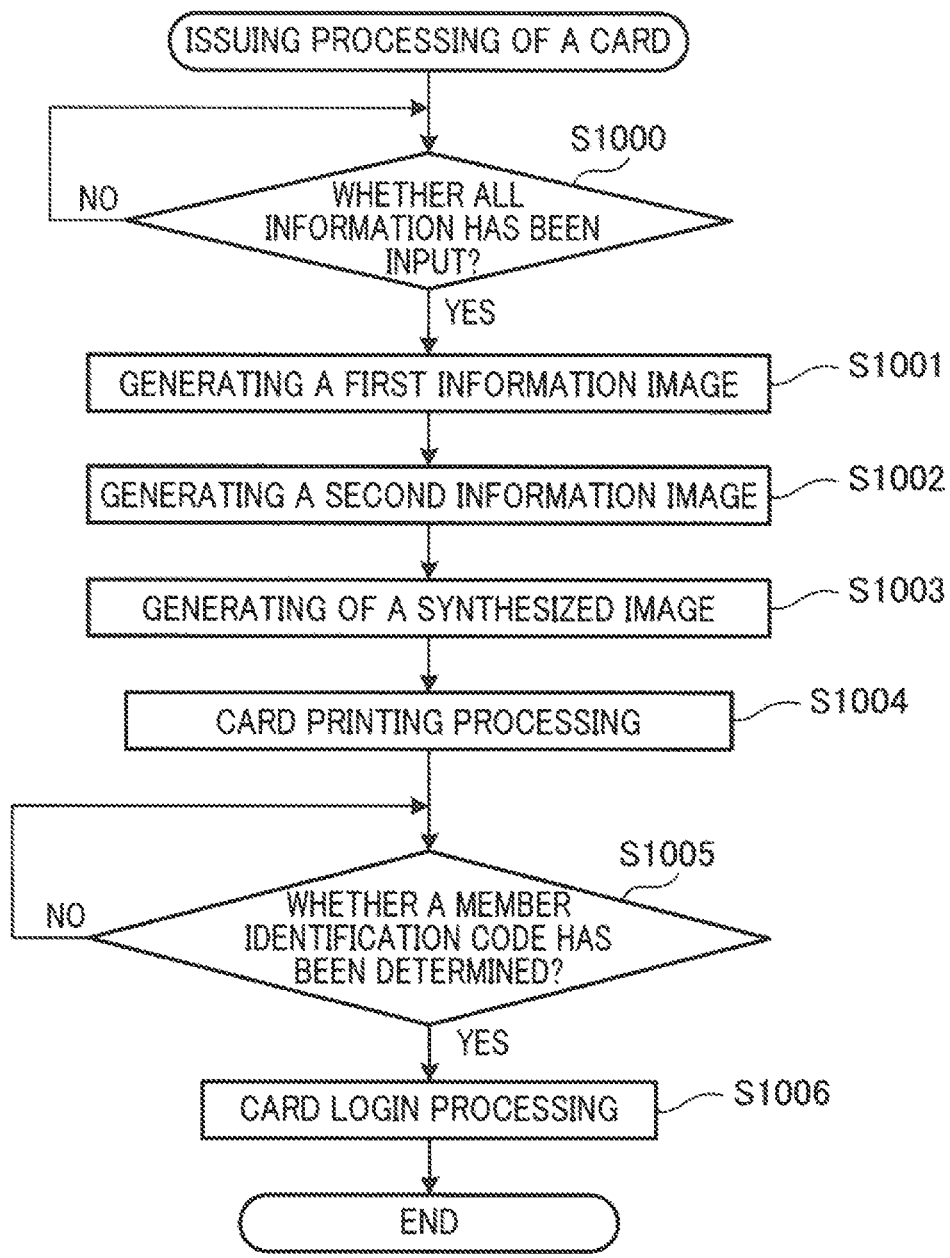
FIG. 22 is a flowchart of an issuing processing of a card performed by a card printing control device of an embodiment of the present invention.

FIG. 22 is a diagram representing an example of the flowchart of the issuing processing of a card.

In S1000, firstly, the card printing control device 3 judges whether the information which is necessary in the plurality of information associated with the user has been input or not. The necessary information is at least the first information 2201 and the second information 2202 printed onto the member card 2. In addition, in the present embodiment, the necessary information contains the information which is required when the member logs in. The text information such as a member name and a domicile is input by the clerk who resides permanently in the admission counter and the like through the keyboard connected with the card printing control device 3 and the like. The data such as a facial image which needs to be taken may be taken by a camera device such as the camera connected with the card printing control device 3, and the passport of the user may also be scanned by a scanner connected with the card printing control device 3 and the like.

If the necessary information is not input (S1000: NO), the card printing control device 3 performs the S1000 again. At this time, the card printing control device 3 may display a message which is used to represent that the necessary information is not input. That is, the card printing control device 3 may comprise a display not shown which is used to display the message.

On the other hand, if the necessary information has been input (S1000: YES), in the S1001, the card printing control device 3 generates the first information image containing the first information 2201 therein. To be more specific, the card printing control device 3 generates a print image which is used to print the first information 2201 on the member card 2 according to the font and the layout stored in the memory part 320 and the like.

Thereafter, in the S1002, the card printing control device 3 generates the second information image containing the second information 2202 therein. To be more specific, the card printing control device 3 generates a print image which is used to print the second information 2202 on the member card 2 according to the font and the layout stored in the memory part 320 and the like. Besides, the print image is converted into a horizontal flipping print image.

Thereafter, in S1003, the card printing control device 3 generates a synthetic image in which the first information image and the second information image are arranged in different regions. To be more specific, the synthetic image is a print image which represents the position relationship between the first information image and the second information image, and wherein a portion which is not printed in addition to the regions of the first information image and the second information image is included. In the above synthetic image, the second information image is arranged in the light transmittable region 2a of the member card 2 which is light transmittable.

Thereafter, in S1004, the card printing control device 3 performs a card printing processing. In the card printing processing, the card printing control device 3 sends the synthetic image generated in the S1003 to the printer 5 and request for printing. The printer 5 performs the printing of the synthetic print image for the base card (the base material layer 21) prearranged in the printer 5 according to the request for printing from the card printing control device 3.

Thereafter, in S1005, the card printing control device 3 judges whether the member identification code is determined. The member identification code may be a number which is assigned to each member card 2 automatically, and may also be the RFID of the IC chip comprised in the transparent IC card 21E of the member card 2. If the member identification code is not determined (S1005: NO), the card printing control device 3 performs the S1005 again.

If the member identification code is the number assigned to each member card 2 automatically, the card printing control device 3 accesses the member management server 13 to confirm the number which is not used and assign the number. In addition, it may also be configured to be that the member management server 13 issues the number of the member identification code according to the request of the carding printing control device 3.

In the condition that the member identification code adopts the RFID of the IC chip comprised in the transparent IC card 21E of the member card 2, the card printing control device 3 uses a card unit not shown connected therewith as the card unit 1741 to acquire the RFID, and the member card 2 is the member card printed in the S1004.

If the member identification code has been determined (S1005: YES), in S1006, the card printing control device 3 performs a card logging in processing. In the card logging in processing, the card printing control device 3 sends the member identification code and a plurality of information associated with the user to the member management server 13 and requests to perform the member logging in. The member management server 13 supplements the data of a new member into the member management table according to request for the member logging in from the card printing control device 3. In addition, if the member identification code is the number assigned to each member card 2 automatically, a processing of logging in the member identification code is performed for the member card 2 printed in the S1004. That is, the card printing control device 3 performs that following processing in which the IC chip of the member card 2 is accessed by using a card unit which is not shown and the member identification code is stored in the member card 2. Thereafter, the card printing control device 3 terminates the present routine.

[The Contents of the Program Executed by the Information Display Device]

Next, the processing (program) executed by the information display device 7 (the controller 70: the CPU 1751 of the PTS terminal 1700, the CPU 121 of the signage 100, the CPU 221 of the kiosk terminal 200 and the like) is illustrated.

[The Information Displaying Processing]

Figure 23:
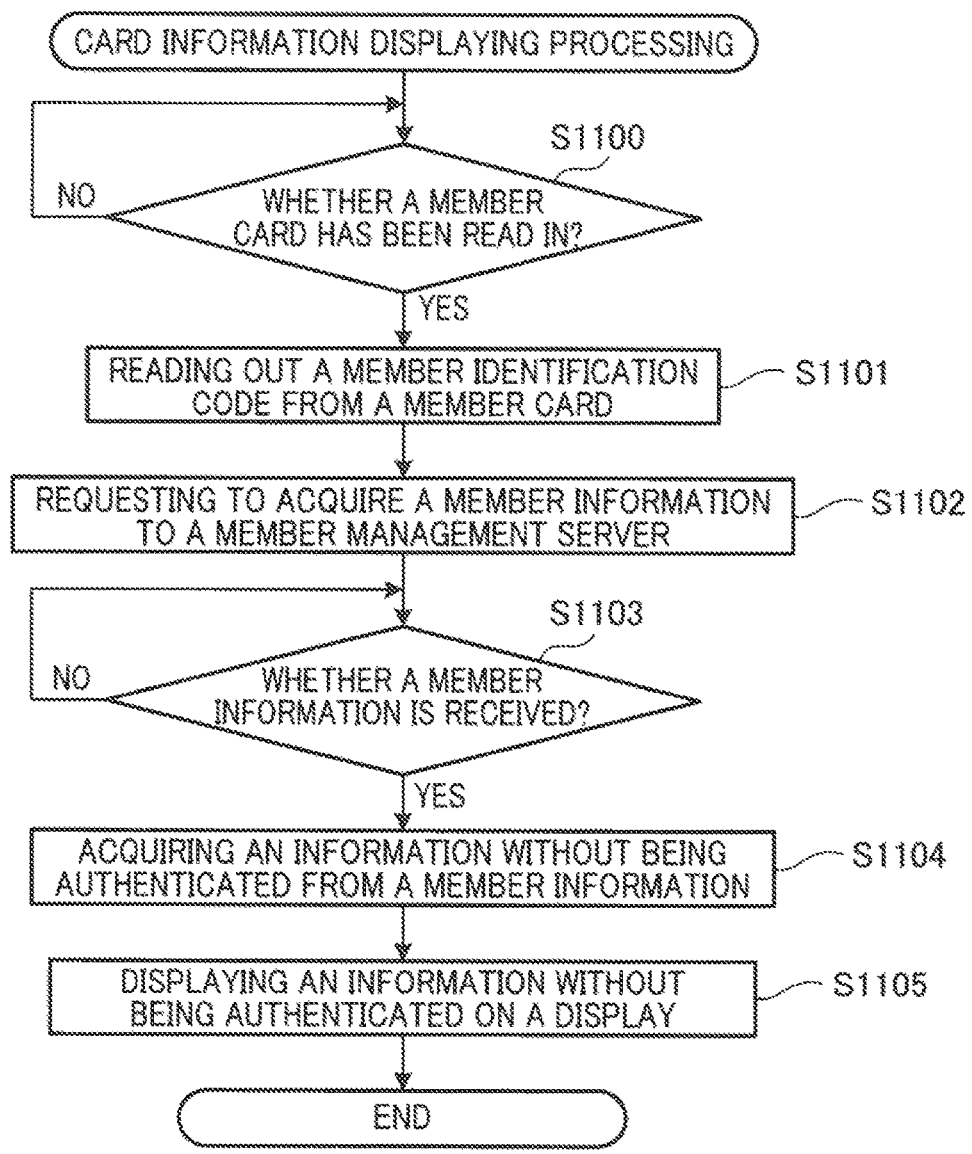
FIG. 23 is a flowchart of an information displaying processing performed by an information display device of another embodiment of the present invention.

FIG. 23 is a diagram representing an example of the flowchart of the information displaying process.

In S1100, firstly, the information display device 7 judges whether the reading card device 71 has read in the member card 2 or not. If the reading card device 71 does not read in the member card 2 (S1100: NO), the S1100 is performed again, waiting for the user to cause the reading card device 71 to read in the member card 2.

If the reading card device 71 has read in the member card 2 (S1100: YES), in S1101, the information display device 7 acquires the member identification code from the member card.

Thereafter, in S1102, the information display device 7 requests to acquire the member identification code and the member information for the member management server 13. Although not shown, the member management server 13 sends the member information corresponding to the member identification code sent to the information display device 7 according to the acquiring request from the information display device 7. The above member information is the plurality of information associated with the member (the user) and the information representing whether an authentication is required which is set for each of the plurality of information.

Thereafter, in S1103, the information display device 7 judges whether the member information is received from the member management server 13. If the member information is not received (S1103: NO), the information display device 7 performs the S1103 again, waiting for receiving the member information.

If the member information has been received (S1103: YES), in S1104, the information display device 7 acquires the information without being authenticated from the member information. That is, the information display device 7 judges whether an authentication is required or not for the plurality of information in the member information respectively. Then, the information display device 7 preserves the information not requiring to be authenticated in a temporary storage region for display. In addition, in the present embodiment, when the information displaying process is performed, the information associated with the user and the information representing whether an authentication is needed are fully acquired from the member management server 13, but it is not limited thereto. For example, the information display device 7 may only acquire the information not requiring to be authenticated from the plurality of information associated with the user.

Then, in S1105, the information display device 7 display the information not requiring to be authenticated display screen (referring to FIG. 19) into the display 73 and terminates the present routine, and the information not requiring to be authenticated display screen contains the information not requiring to be authenticated which is stored in the temporary storage region for display in the S1104.

As mentioned above, the information display device 7 may display the information associated with the user which is set to not require an authentication only by reading in the member card 2 without the member logging in authentication.

In addition, although not shown, the information display device 7 may also be configured to display the logging in picture for the member logging in after the information not requiring to be authenticated display screen is displayed. The logging in may be performed by inputting a password such as a PIN code, and may also be performed by a biometrics authentication which is achieved by inputting a fingerprint, a Iris, a vein, a voiceprint, a face, a handwriting and the like.

[The Authentication Switching Process]

Figure 24:
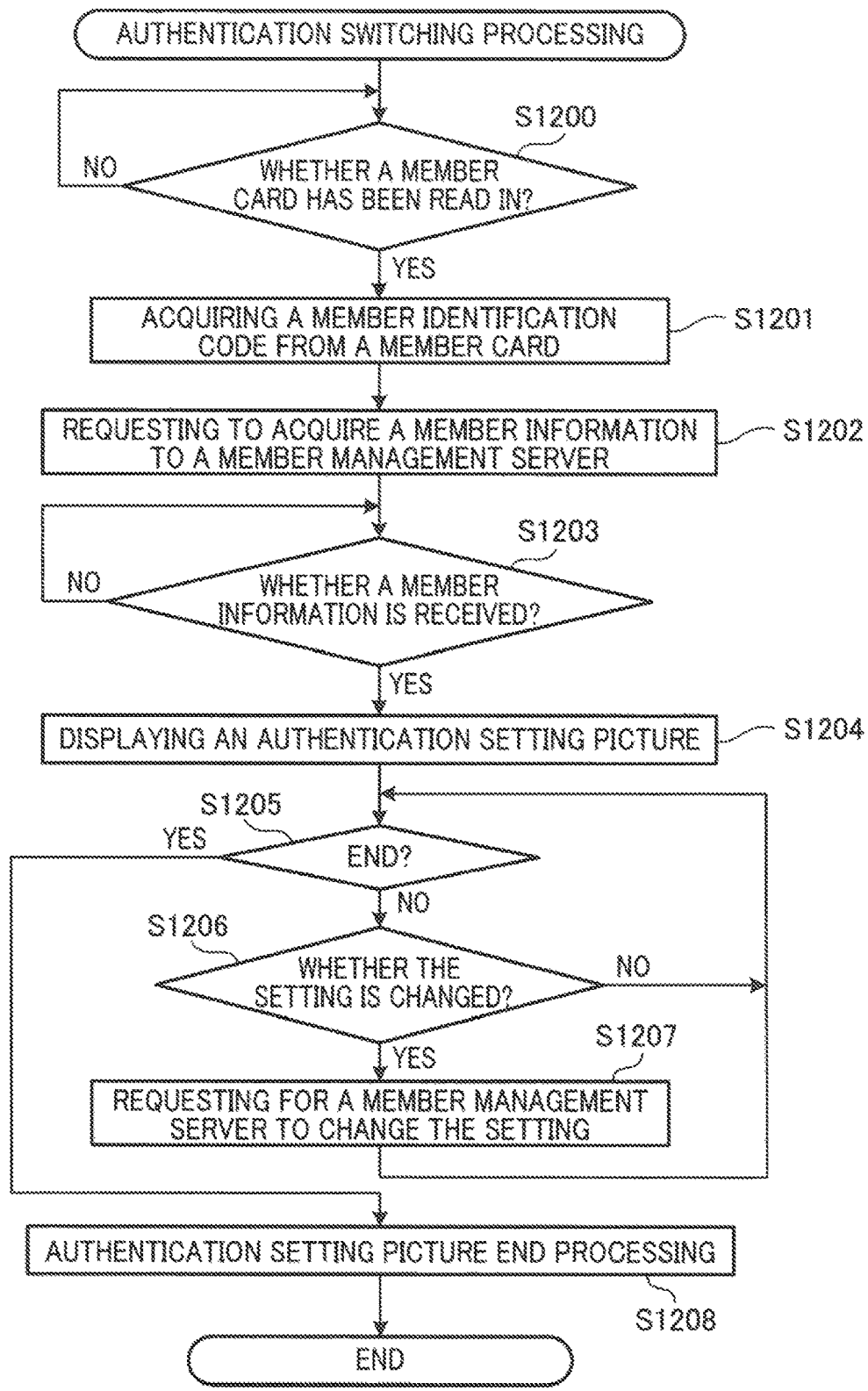
FIG. 24 is a flowchart of an authentication switching processing performed by an information display device of another embodiment of the present invention.

FIG. 24 is a diagram representing an example of the flowchart of the authentication switching process. The authentication switching process is performed through touching a button displayed by a menu screen not shown which is used to switch the information not requiring to be authenticated, for example, by the member after logging in.

In S1200, firstly, the information display device 7 judges whether the reading card device 71 has read in the member card 2 or not. If the reading card device 71 does not read in the member card 2 (S1200: NO), the S1200 is performed again, waiting for the user to cause the reading card device 71 to read in the member card 2.

If the reading card device 71 has read in the member card 2 (S1200: YES), in S1201, the information display device 7 acquires the member identification code from the member card. In addition, after the member logging in, if it is within a predetermined time, the processing at the S1200 and S1201 may be omitted.

Thereafter, in S1202, the information display device 7 requests to acquire the member identification code and the member information for the member management server 13. Although not shown, the member management server 13 sends the member information corresponding to the member identification code sent to the information display device 7 according to the acquiring request from the information display device 7. The above member information is the plurality of information associated with the member (the user) and the information representing whether an authentication is required which is set for each of the plurality of information.

Thereafter, in S1203, the information display device 7 judges whether the member information is received from the member management server 13. If the member information is not received (S1203: NO), the information display device 7 performs the S1203 again, waiting for receiving the member information.

If the member information has been received (S1203: YES), in S1204, the authentication setting picture is displayed in the information display device 7 (referring to FIG. 20). To be more specific, the information display device 7 displays the plurality of information associated with the user as the plurality of the user information items 733. In addition, the information display device 7 judges whether it is required to be authenticated for each of the plurality of information associated with the user, performs a gray out display for the button of not requiring an authentication 735 corresponding to the user information item 733, for the information which is set to require an authentication, and performs the gray out display for the button of requiring an authentication 734 corresponding to the user information item 733, for the information which is set to require an authentication.

In S1205, the information display device 7 judges whether it ends or not. That is, the information display device 7 judges whether a return button is touched or not in the authentication setting picture. If it is judged to be end (S1205: YES), in S1208, the information display device 7 terminates the authentication setting picture, and converts the picture into the menu screen for the member and the like, and thus terminates the present routine.

If it is judged to be not end (S1205: NO), in S1206, the information display device 7 judges whether the setting is switched. That is, the information display device 7 judges a certain button of requiring an authentication 734 or button of not requiring an authentication 735 is touched. If the setting is not switched (S1206: NO), the information display device 7 returns the processing to the S1205.

If the setting is switched (S1206: YES), in S1207, the information display device 7 requests for the member management server 13 to switch the setting. That is, the information display device 7 judges a certain button of requiring an authentication 734 or button of not requiring an authentication 735 corresponding to the user information item 733 is touched. Then, the information display device 7 determines it is which information of the plurality information associated with the user and whether the information is set to be the information requiring to be authenticated or the information not requiring to be authenticated. Then, the information display device 7 sends the member identification code, the information associated with the user, and the information representing whether the information requires an authentication (requires or not requires) to the member management server 13, and requests to switch the setting.

Although not shown, the member management server 13 switches the setting information representing whether the information associated with the user requires an authentication which is sent from the information display device 7 in the member management table (referring to FIG. 21) such that the information representing whether an authentication is required which is sent from the information display device 7 is displayed, according to the setting switching request from the information display device 7.

For example, in the information display device 7, when the button of requiring an authentication 734 of the user information item 733 of the member name is touched, the information display device 7 sends the member identification code and "member name" as the information associated with the user to the member management server 13, and sends "requiring an authentication" as the information representing whether an authentication is required. The member management server 13 switches the data of the column of "member name authentication" of the data corresponding to the member identification code to be "requiring an authentication".

Then, the information display device 7 requests for the member management server 13 to switch the setting in the S1207 and then enters the processing of the S1205.

[The Summary of the Invention]

The member card 2 of the present embodiment comprises the base material layer 21 having the light transmittable base material and the printing layer 22, and wherein the first information 2201 to be confirmed from the first surface 21*a* of the base material layer 21 and the second information 2202 to be confirmed from the second surface 21*b* of the base material layer 21 are only printed on one surface of the base material layer 21. In the base material layer 21, the region which is printed with the second information 2202 is light transmittable region, and the second information 2202 may be visually recognized from the second surface 21*b* of the base material layer 21.

According to the above structure, the first surface 21*a* of the base material layer 21 of the member card 2 is printed with the first information 2201 to be confirmed from the first surface 21*a* of the base material 21 and the second information 2202 to be confirmed from the second surface 21*b* of the base material 21. The base material layer 21 is configured to be that the region which is printed with the second information 2202 is light transmittable region, and in addition, the second information 2202 may be visually recognized from the second surface 21*b* of the base material layer 21. Thereby, when the member card is issued on the spot, only the first surface 21*a* of the member card 2 is required to be printed, and thus the member card 2 is not required to turn over to be printed again such that the member card 2 is issued smoothly.

In addition, the base material layer 21 of the member card 2 of the present embodiment has the opaque layer 2102 (the second design printing layer 21F), and the opaque layer 2102 stacks up to cover the first information 2201. According to the above structure, the base material layer 21 has the opaque layer such that the first information 2201 is covered, and thus the first information 2201 is only visually recognized from the second surface 21*b* of the base material layer 21.

In addition, the card printing control device 3 of the present embodiment is connected with the printer 5 which may print the member card 2, comprising the input device 310 which is capable of inputting the first information 2201 to be confirmed from the first surface 21*a* of the member card 2 and the second information 2202 to be confirmed from the second surface 21*b* of the member card 2. The controller 300 generates the first information image containing the first information 2201 from the input device 310 therein, and generates the second information image containing the second information 2202 from the input device 310 therein, and in the second information image, the second information 2202 is formed to be a horizontal flipping mirror image. The first information image and the second information image are synthesized to be arranged in different regions of the member card 2 such that the obtained synthetic image is only printed on the first surface 21*a* of the member card 2, and the region on which the second information image is printed is formed to be a light transmittable region.

As mentioned above, the first image to be confirmed from the first surface 21*a* of the member card 2 and the second image to be confirmed from the second surface 21*b* of the card are generated only through inputting the first information 2201 and the second information 2202 and they are printed onto the member card 2 after being synthesized. The second image is printed after being formed to be a horizontal flipping mirror image, and thus the second image may be visually recognized normally when the layer printed is visually recognized from the second surface 21*b* through the light transmittable base material layer 21. Thereby, only the first surface 21*a* of the member card 2 is printed when the member card 2 is issued on the spot, and the information to be confirmed from the first surface 21*a* and the information to be confirmed from the second surface 21*b* are printed just one time without turning over the member card 2 such that the member card 2 is able to be issued smoothly.

The information display device 7 of the present embodiment comprises the reading card device 71 which may read the member card 2 owned by the user and having the member identification code used to identify the user, the accessing device 72 which may access the member management server 13 storing the plurality of information associated with the user therein, the display 73 which may display the plurality of information associated with the user, and the controller 70. In the member management server 13, the plurality of information associated with the user is respectively distinguished to be the information requiring to be authenticated and the information not requiring to be authenticated respectively and then stored, and the controller 70 acquires the information not requiring to be authenticated from the member management server 13 according to the member identification code after the reading card device 71 reads the member card 2, and directly displays the information not requiring to be authenticated acquired on the display 73 without being authenticated by the user.

According to the above structure, in the member management server 13 storing the plurality of information associated with the user, the plurality of information associated with the user is respectively distinguished to be information not requiring to be authenticated and information requiring to be authenticated and then stored. After the user uses the information display device 7 to read the member card 2, the information not requiring to be authenticated acquired from the member management server 13 is displayed without being authenticated such as login by the user. Thereby, the user only uses the information display device 7 to read the member card 2, and regarding the information which is set to be information not requiring to be authenticated, it is automatically displayed by the information display device 7 without being authenticated such as login, and thus it may increase the convenience for the user who wants to confirm the information not requiring to be authenticated.

The information display device 7 of the present embodiment further comprises the input device 74 receiving the input from the user. The controller 70 may dependently switch the plurality of information associated with the user stored in the member management server 13 to be the information not requiring to be authenticated or the information requiring to be authenticated according to the input from the user.

According to the above structure, the user may select which information is taken as the information displayed in the information display device 7 without being authenticated from the plurality of information associated with the user stored in the member management server 13 such that the information which is automatically displayed in the information display device without being authenticated is defined to be the information desired by the user.

The above embodiments thus described solely serves as specific examples of the present invention, and the present invention is not limited to such examples. Specific configurations of various means may be suitably designed or modified. Further, the effects of the present invention described in the above embodiments are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. An information display device, comprising:
  a card-reading device, which is configured to read user identification information from a card;
  an information-accessing device, which is configured to access a plurality of information that is associated with the user and that is stored in an upper level device, the plurality of information being distinguished between information not requiring authentication in order to be displayed and information requiring authentication in order to be displayed;
  a display, which is configured to display the plurality of information associated with the user; and
  a controller, the controller being configured such that when the card-reading device reads the card, the controller 1) acquires the information not requiring authentication in order to be displayed from the upper level device according to the user identification information, and 2) causes the acquired information not requiring authentication to be displayed directly in the display without being authenticated by the user.

2. The information display device of the claim 1, further comprising an input device configured to receive an input from the user,
  wherein the controller is configured to dependently switch the plurality of information associated with the user stored in the upper level device to be the information not requiring authentication or the information requiring authentication according to the input from the user.

3. The information display device of the claim 1, further comprising an input device configured to receive an input from the user,
  wherein the controller is configured to cause the display to switch between display of 1) the member information stored in the member management server in association with the user identification information and not requiring authentication and 2) the member information stored in the member management server in association with the user identification information and requiring authentication according to the input from the user.

4. An information display device that is located in a casino and that is configured to display sets of member information, comprising:
  a card-reading device, including an antenna, which is configured 1) to communicate in a contactless manner with a member card that includes user identification information used to identify a member user, and 2) to read the user identification information from the member card;
  an information-accessing device, which is configured to access and acquire from a member management server sets of information associated with the user identification information and stored by the member management server, the user identification information being stored by the member management server in association with information not requiring authentication in order to be displayed and information requiring authentication in order to be displayed a display, which is configured to display the sets of information acquired from the member management server and associated with the user identification information; and a controller, the controller being configured such that when the card-reading device reads the member card, the controller 1) acquires the member information from the member management server according to the user identification information, and 2) causes the member information not requiring authentication to be displayed directly in the display without being authenticated by the user.

5. An information display device configured to access an upper level device storing previously stored sets of user information and to display the sets of user information, comprising:

a reading device configured to read user identification information used to identify each user;

a display configured to receive the sets of user information stored in the upper level device based on the user identification information read by the reading device and to display the received sets of user information; and a controller, the sets of user information stored in the upper level device being associated with the user identification information, and each set of user information including user information not requiring authentication to be displayed on the display and user information requiring authentication to be displayed on the display, and the controller causing to be displayed on the display the user information received from the upper level device and not requiring authentication on condition that the user identification information is read by the reading device, and the controller causing to be displayed on the display the user information received from the upper level device and requiring authentication on condition that the user identification information is read by the reading device and further authentication is done.

* * * * *